United States Patent
Miller et al.

(10) Patent No.: US 10,353,204 B2
(45) Date of Patent: Jul. 16, 2019

(54) FEMTOPROJECTOR OPTICAL SYSTEMS

(71) Applicant: Spy Eye, LLC, Los Gatos, CA (US)

(72) Inventors: Gregory David Miller, San Jose, CA (US); Brian Elliot Lemoff, Morgan Hill, CA (US); George Michael Mihalakis, San Jose, CA (US); Ronald Maynard, Austin, TX (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 15/570,707

(22) PCT Filed: Oct. 18, 2017

(86) PCT No.: PCT/US2017/057240
§ 371 (c)(1),
(2) Date: Oct. 30, 2017

(87) PCT Pub. No.: WO2018/080874
PCT Pub. Date: May 3, 2018

(65) Prior Publication Data
US 2019/0049730 A1     Feb. 14, 2019

Related U.S. Application Data

(60) Provisional application No. 62/473,268, filed on Mar. 17, 2017, provisional application No. 62/415,376, filed on Oct. 31, 2016.

(51) Int. Cl.
*G02B 27/01*     (2006.01)
*G02B 17/06*     (2006.01)
(Continued)

(52) U.S. Cl.
CPC ......... *G02B 27/0172* (2013.01); *G02B 5/003* (2013.01); *G02B 17/061* (2013.01);
(Continued)

(58) Field of Classification Search
None
See application file for complete search history.

(56) References Cited

U.S. PATENT DOCUMENTS 4,711,512 A * 12/1987  Upatnieks ........ G02B 27/0103
                                                345/7
5,638,218 A     6/1997  Oomura
(Continued)

FOREIGN PATENT DOCUMENTS

GB          1216075 A     12/1970

OTHER PUBLICATIONS

Song, Ning, Zongmin Yin, and Fengyao Hu. "Baffles design for the axial two-mirror telescope." Optical Engineering 41.9 (2002): 2353-2357 (Year: 2002).*
(Continued)

*Primary Examiner* — Xin Sheng
(74) *Attorney, Agent, or Firm* — Fenwick & West LLP

(57) ABSTRACT

A variety of femtoprojector optical systems are described. Each of them can be made small enough to fit in a contact lens using plastic injection molding, diamond turning, photolithography and etching, or other techniques. Most, but not all, of the systems include a solid cylindrical transparent substrate with a curved primary mirror formed on one end and a secondary mirror formed on the other end. Any of the designs may use light blocking, light-redirecting, absorbing coatings or other types of baffle structures as needed to reduce stray light.

23 Claims, 32 Drawing Sheets

(51) Int. Cl.
*G03B 21/00* (2006.01)
*G02C 7/04* (2006.01)
*G03B 21/28* (2006.01)
*G03B 29/00* (2006.01)
*G02B 5/00* (2006.01)
*G02B 27/00* (2006.01)

(52) U.S. Cl.
CPC .......... *G02B 27/0093* (2013.01); *G02C 7/04* (2013.01); *G03B 21/00* (2013.01); *G03B 21/28* (2013.01); *G03B 29/00* (2013.01); *G02B 2027/0178* (2013.01); *G02B 2027/0196* (2013.01)

(56) References Cited

U.S. PATENT DOCUMENTS

| | | | |
|---|---|---|---|
| 5,638,219 | A | 6/1997 | Medina Puerta et al. |
| 5,682,210 | A | 10/1997 | Weirich |
| 6,560,039 | B1 | 5/2003 | Webb et al. |
| 8,134,778 | B2 | 3/2012 | Guyer |
| 8,571,789 | B2 | 10/2013 | Monde et al. |
| 8,786,675 | B2 | 7/2014 | Deering |
| 9,063,352 | B2 | 6/2015 | Ford et al. |
| 9,111,473 | B1 | 8/2015 | Ho et al. |
| 9,134,534 | B2 | 9/2015 | Border et al. |
| 9,251,745 | B2 | 2/2016 | Sprague |
| 9,507,174 | B2 | 11/2016 | Qin |
| 2002/0140906 | A1 | 10/2002 | Gibbon et al. |
| 2005/0180687 | A1 | 8/2005 | Amitai |
| 2006/0227067 | A1 | 10/2006 | Iwasaki |
| 2009/0189830 | A1 | 7/2009 | Deering et al. |
| 2011/0176205 | A1 | 7/2011 | Shaw et al. |
| 2011/0221659 | A1 | 9/2011 | King, III et al. |
| 2012/0154876 | A1 | 6/2012 | Shimoda |
| 2013/0120362 | A1 | 5/2013 | Harris et al. |
| 2013/0126827 | A1 | 5/2013 | Bibl et al. |
| 2013/0278631 | A1* | 10/2013 | Border ............... G02B 27/017 345/633 |
| 2014/0098226 | A1 | 4/2014 | Pletcher et al. |
| 2014/0118829 | A1* | 5/2014 | Ma ..................... G02B 5/1885 359/567 |
| 2015/0301338 | A1 | 10/2015 | Van Heugten |
| 2015/0312560 | A1 | 10/2015 | Deering et al. |
| 2016/0097940 | A1 | 4/2016 | Sako et al. |
| 2018/0120568 | A1 | 5/2018 | Miller et al. |

OTHER PUBLICATIONS

Peifu, G., "Design and Preparation of Quarter-Wave Plate Coatings," National Air Intelligence Center, May 12, 1995, 16 pages.
Tremblay, E.J. et al., "Ultrathin Cameras Using Annular Folded Optics," Applied Optics, pp. 463-471, vol. 46, No. 4.
PCT International Search Report and Written Opinion, PCT Application No. PCT/US17/57240, dated Jan. 12, 2018, 23 pages.
"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL:https://web.archive.org/web/20160803183105/http://www.telescope-optics.net/two-mirror.htm>.
Avago Technologies, "ADNE-2620 Optical Mouse Sensor Data Sheet," Mar. 27, 2008, 27 pages.
International Search Report and Written Opinion, PCT Application No. PCT/US2018/035194, dated Aug. 9, 2018, 15 pages.
United States Office Action, U.S. Appl. No. 16/058,973, dated Dec. 10, 2018, 27 pages.
All-Reflecting Two-Mirror Telescopes, (Aug. 3, 2016), URL: https://web.archive.org/web/20160803183105/ http://www.telescope-optics.net/two-mirror.htm, (Dec. 14, 2017) (5 pages).

* cited by examiner

FEMTOPROJECTOR OPTICAL SYSTEMS

RELATED APPLICATIONS

This application is the U.S. National Stage of International Application No. PCT/US17/57240, "Femtoprojector Optical Systems," filed Oct. 18, 2017. PCT/US17/57240 claims priority to U.S. Provisional Patent Application Ser. No. 62/415,376, "Femtoprojector Optical Systems," filed Oct. 31, 2016; and to U.S. Provisional Patent Application Ser. No. 62/473,268, "Femtoprojector Optical Systems," filed Mar. 17, 2017. The subject matter of all of the foregoing is incorporated herein by reference in their entirety.

BACKGROUND

1. Technical Field

This disclosure relates generally to projectors for eye-mounted displays.

2. Description of Related Art

An eye-mounted display has been proposed by Deering. See, e.g. U.S. Pat. No. 8,786,675, "Systems using eye mounted displays". One type of eye-mounted display is based on a tiny projector mounted inside a contact lens. The projector projects images onto the retina of a person wearing the lens.

The video projector must be very small to fit in the contact lens, so small that Deering called it a "femtoprojector". A typical femtoprojector is no larger than about a millimeter in any dimension.

A femtoprojector includes an image source and an optical system. The image source may be a display chip such as an array of light-emitting pixels. A light emitting diode (LED) array is an example of a display chip. The optical system projects light from the image source onto the retina.

Before light reaches the retina it travels through the eyeball including the cornea and the eye's own lens. A femtoprojector's optical system is designed to project images from the display chip onto the retina so that they appear in a person's field of vision.

What are needed are designs for femtoprojector optical systems that fit inside contact lenses while also providing appropriate magnification and good image quality.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Femtoprojector optical systems are designed to project images from an image source that is inside a contact lens onto a user's retina. Femtoprojector optical systems described below are small enough to fit inside contact lenses, can be made with realistic manufacturing processes, and are designed to provide good image quality on a person's retina.

Figure 1:
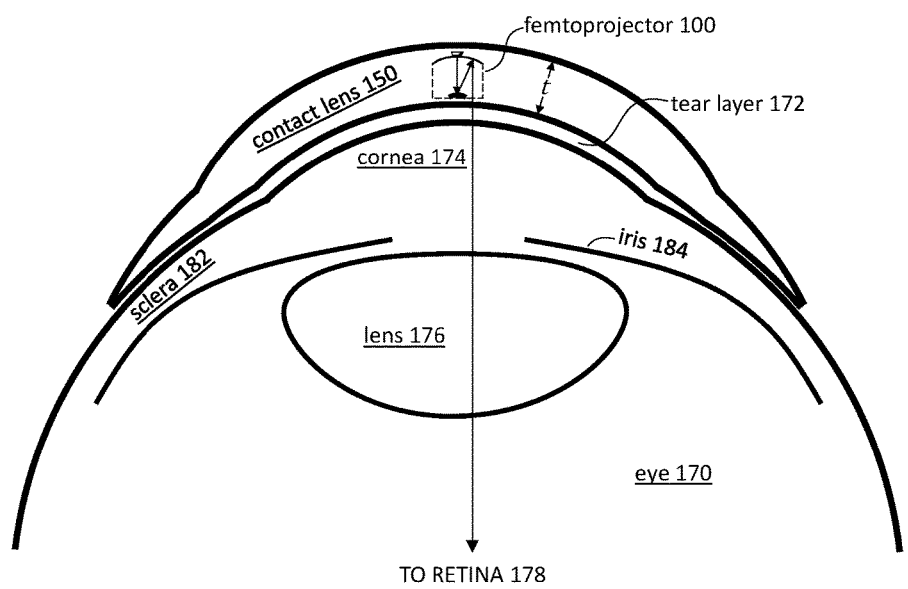
FIG. 1 shows a cross sectional view of an eye-mounted display containing a femtoprojector in a contact lens.

FIG. 1 shows a cross sectional view of an eye-mounted display containing a femtoprojector 100 in a contact lens 150. FIG. 1 shows an embodiment using a scleral contact lens but the contact lens does not have to be scleral. The contact lens 150 is separated from the cornea 174 of the user's eye 170 by a tear layer 172. Over the cornea 174, the tear layer 172 may be as thick as a hundred microns or more while it may be only a few microns thick over the sclera 182. The aqueous of the eyeball is located between the cornea and the crystalline lens 176 of the eye. The vitreous fills most of the eyeball including the volume between the intraocular lens 176 and the retina 178. The iris 184 limits the aperture of the eye.

The contact lens 150 preferably has a thickness, t, that is less than two mm, and the femtoprojector 100 preferably fits in a 2 mm by 2 mm by 2 mm volume. The contact lens 150 is comfortable to wear and maintains eye health by permitting oxygen to reach the cornea 174.

In the design of FIG. 1, the optical path from the image source in the femtoprojector 100 to the retina 178 does not include any air gaps. As a result, the femtoprojector 100 embedded in contact lens 150 is insensitive to the air—cornea interface that provides most of the focusing power in an unaided eye. Further, the system is not affected by variations in cornea shape that occur from one person to another.

Figure 2:
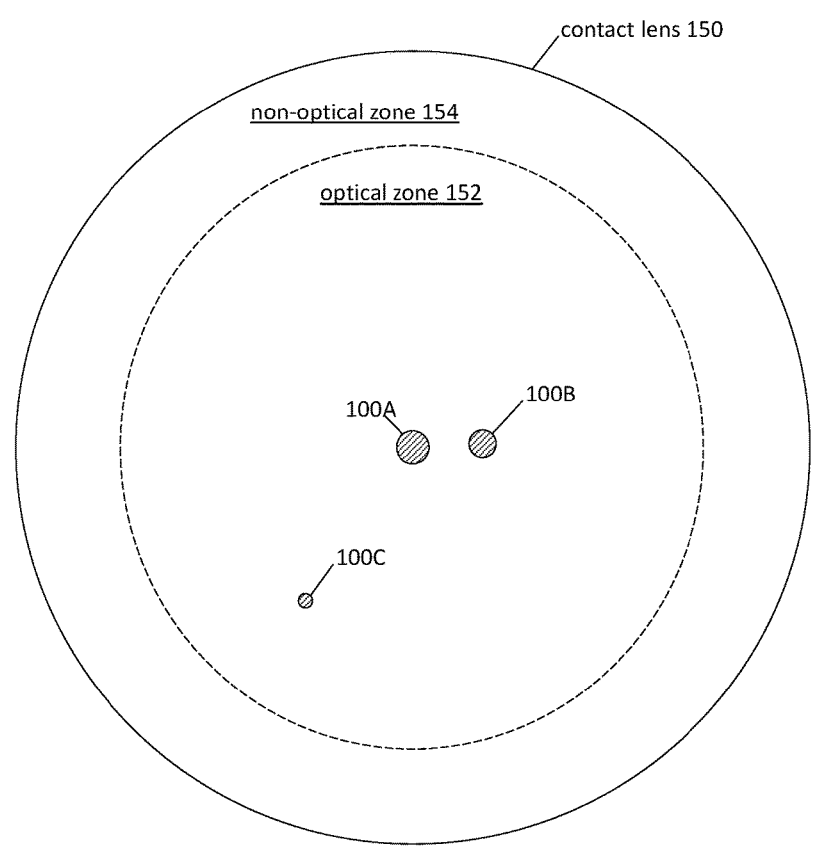
FIG. 2 shows a top view of an eye-mounted display containing multiple femtoprojectors in a contact lens.

FIG. 2 shows a top view of an eye-mounted display with multiple femtoprojectors 100A-C in a contact lens 150. The ratio of the contact lens diameter to femtoprojector lateral size is roughly 25:1 for the largest femtoprojector. This ratio is normally between about 15:1 and 30:1, but may be as small as 5:1 or as large as 50:1. FIG. 2 shows three femtoprojectors 100A-C in the contact lens, but many femtoprojectors, or only one, may be mounted in such a lens. Eye-mounted displays with as many as 49 femtoprojectors in a contact lens have been proposed. If there is only one femtoprojector in a lens, it need not be in the center of the lens.

The femtoprojectors 100 in FIG. 2 are also shown as having different sizes. The retinal receptive fields are more densely packed towards the fovea and become progressively less densely packed away from the fovea. Accordingly, in one implementation, femtoprojectors that project to the fovea generate higher resolution images on the retina, and those that project to the periphery of the retina generate correspondingly lower resolution images. The entire display, made up of all the femtoprojectors, may be a variable resolution display that generates only the resolution that each region of the eye can actually see, vastly reducing the total number of individual "display pixels" required compared to displays of equal resolution and field of view that are not eye-mounted. Pixels in an eye-mounted display that are viewed by lower resolution off-foveal regions of the retina will always be viewed by those lower resolution regions and, therefore, can project lower resolution pixels on the retina while still matching the eye's resolution. As a result, a 400,000 pixel eye-mounted display using variable resolution can cover the same field of view as a fixed external display containing tens of millions of discrete pixels.

In FIG. 2, the contact lens 150 is roughly divided by the dashed circle into an optical zone 152 and a non-optical zone 154. Components in the optical zone 152 may be in the optical path of the eye, depending on how far open the iris is. Components in the non-optical zone 154 fall outside the aperture of the eye. In addition to the femtoprojectors 100, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers and fiducial or other structures used for eye tracking and head tracking.

In addition to the eye-mounted display, the overall system may also include a head tracker, eye tracker and scaler. The system receives input images (including possibly video), which are to be displayed to the human user via the eye-mounted display. The femtoprojectors project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Figure 3A:
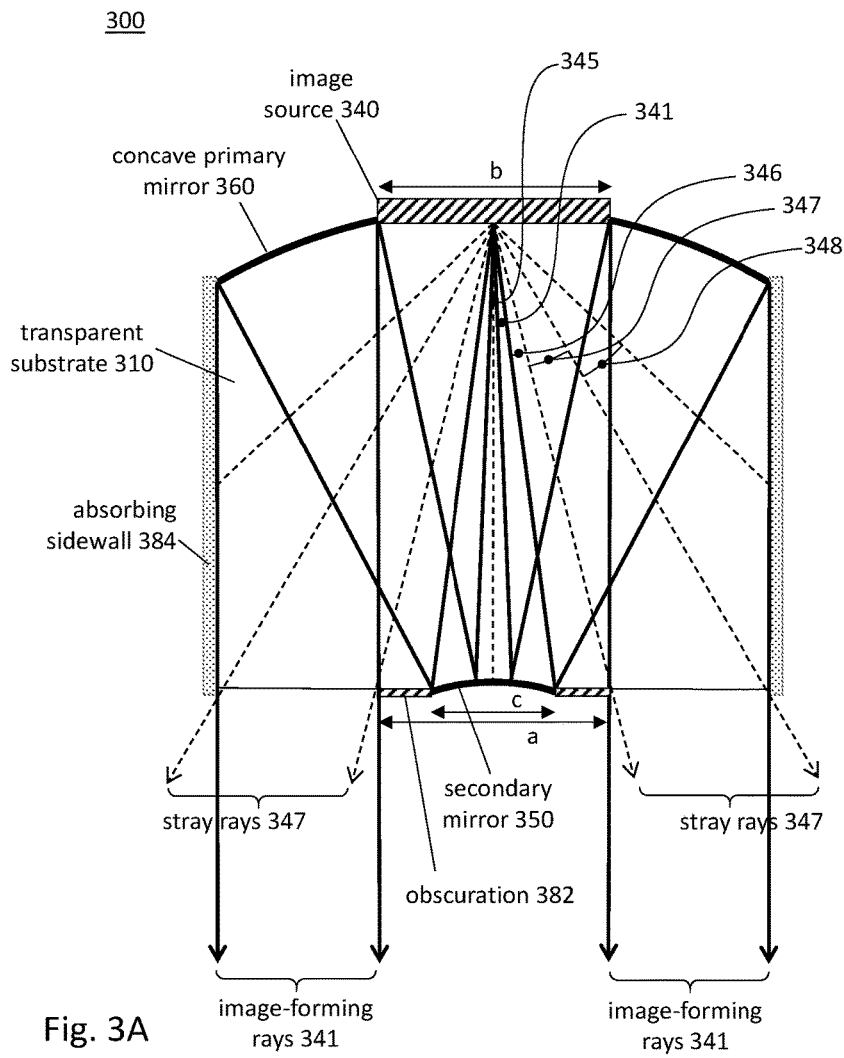
FIGS. 3A and 3B show cross sectional views of a femtoprojector optical system, with rays from a center and edge of the image source, respectively.
Figure 3B:
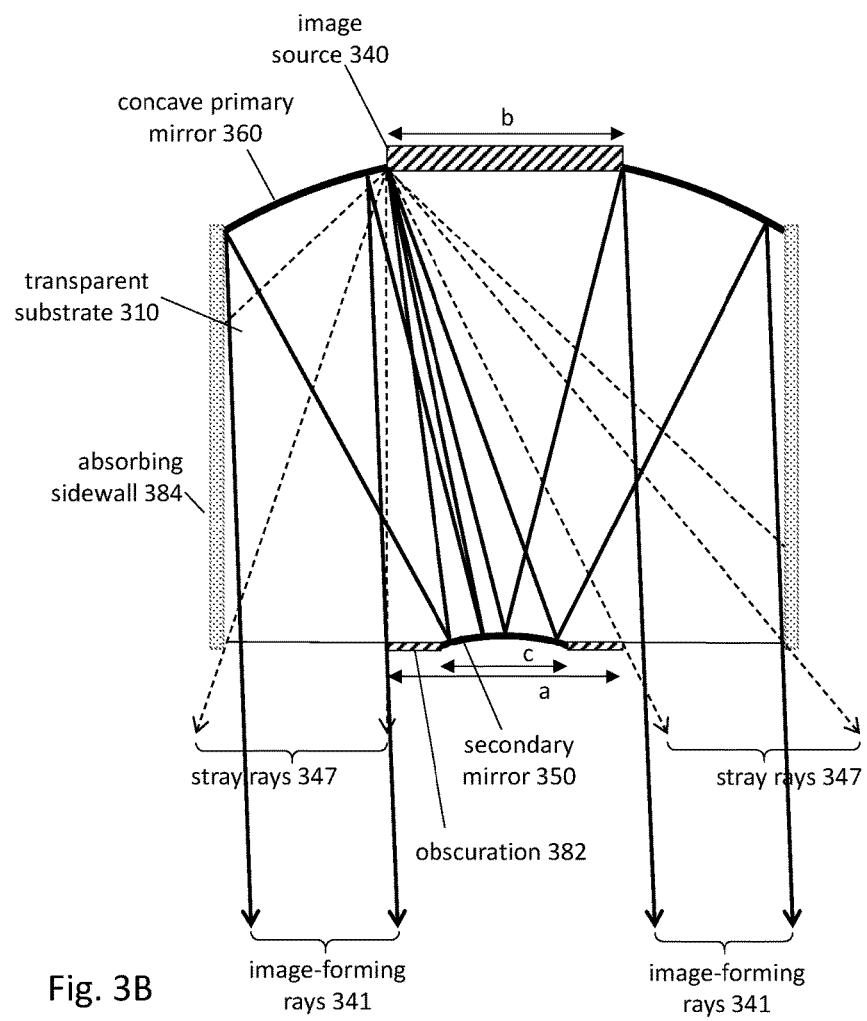
Figure 4:
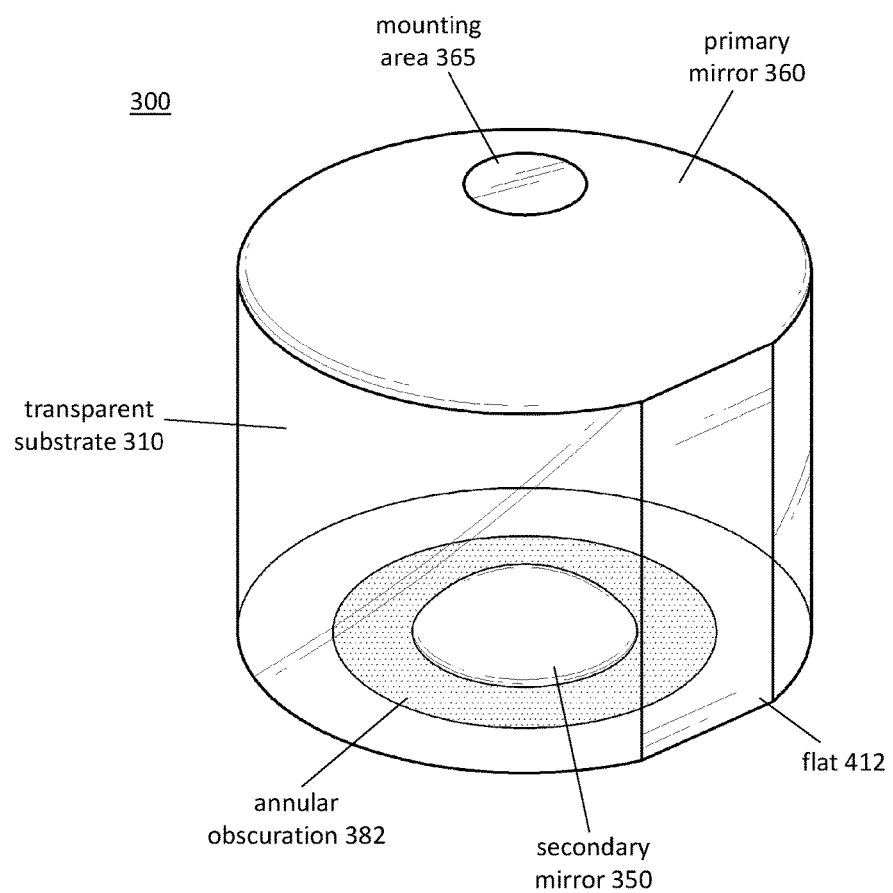
FIG. 4 shows a perspective view of a femtoprojector optical system.

FIGS. 3A-3B show cross sectional views of a femtoprojector optical system 300, and FIG. 4 shows a perspective view of a femtoprojector optical system. The system of FIG. 3 includes a solid, transparent substrate 310 having index of refraction $n_1$. Contact lens material, in which a femtoprojector optical system may be embedded, has an index of refraction $n_2$. The solid transparent substrate 310 may be made from plastic, glass or other transparent materials.

The system of FIG. 3 includes a concave primary mirror 360 and a convex secondary mirror 350. Either or both of these may be aspheric. The concave primary mirror 360 may be formed by coating an end of the substrate 310 with a reflective material such as a metal (e.g. aluminum or silver) or an engineered stack of dielectric layers. The shape of the primary mirror 360 may be made by any of several different techniques. For example, if the substrate is injection-molded plastic, then the shape of the primary mirror 360 follows the shape of the mold used. Alternatively, the shape of the primary mirror 360 may be made by diamond turning the substrate on a lathe. Or, the shape of the primary mirror 360 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed.

The primary mirror 360 includes a clear, non-reflective mounting area 365 of size "b". An image source 340, such as an LED (light emitting diode) display chip with an array of individually addressable emitters, is mounted at this location. Alternate image sources include illuminated photomasks or single light emitting diodes, as examples. Of course, video is more exciting than a static pattern or one with only very few pixels. However, these more limited image sources are useful for some applications.

The secondary mirror 350 faces the image source 340, and the primary mirror 360 faces the secondary mirror 350. Light rays from the image source 340 are first incident on and reflected by the secondary mirror 350 (convex in this example). The reflected rays are then incident on and further reflected by the primary mirror 360 before exiting the optical system. The primary mirror 360 is "primary" because it is bigger than the secondary mirror 350. When the optical system is used in a femtoprojector, light from the image source 340 strikes the secondary mirror 350 before the primary mirror 360. Although the secondary mirror 350 in FIG. 3 is drawn smaller than the size, b, of the opening 365 in the primary mirror, it need not be. For example, in FIG. 4, the secondary mirror 350 is larger than the mounting area 365.

The secondary mirror 350 and primary mirror 360 cooperate to project the image from the image source 340 onto the user's retina. However, not all light rays from the image source 340 may be successfully projected as part of image formation. Those light rays that are successfully projected to form an image are referred to as image-forming rays. The remaining light rays from the image source 340 are referred to as stray rays. FIG. 3A shows a fan of rays produced by the center point of the image source 340, and FIG. 3B shows the same fan of rays but produced by an edge point of the image source 340. This fan can have a fairly wide divergence if the source is an LED or other source that is not well collimated. In many cases, the image source 340 will have a Lambertian distribution.

The system also includes a light baffle system to block or at least reduce the stray rays that reach the exit aperture and/or to direct exiting stray rays to areas away from the projected image. Preferably, the ratio of power in the stray rays that exit the femtoprojector optical system to power in the image-forming rays that exit the femtoprojector optical system does not exceed 1:2. In FIG. 3, the baffle system includes an obscuration 382 and sidewalls 384 (or other types of side baffles). The absorbing sidewalls 384 are external to the primary mirror 360. Typically, the sidewalls 384 will border the external edge of the primary mirror 360 and extend axially to form a cylindrical absorbing structure. They may be either an integral part of the femtoprojector optical system or a surrounding structure in which the optical system is mounted. Absorbing or black sidewalls may also make the femtoprojector less visible to others.

In this example, the obscuration 382 is an annular, absorbing ring that surrounds the secondary mirror 350. It may be made by depositing an absorbing material such as carbon, roughened or etched nickel ("nickel black"), black chrome, or Vantablack (Surrey NanoSystems, Newhaven, UK) around the secondary mirror 350. The size of the obscuration is "a". In the system of FIG. 3, a=b. The obscuration 382 is part of a light baffle system to control stray rays, but it may also be used to control or enhance depth of focus.

Referring first to FIG. 3A, rays from the image source 340 can be classified as follows. FIG. 3A shows different rays emitted from the center of the image source 340. The bundle of rays 341 (where the edges of the bundle are defined by the two solid rays) are reflected by the secondary mirror 350 and the primary mirror 360 and are projected to form the image on the user's retina. These are the image-forming rays 341. In FIG. 3A, the image-forming ray bundle 341 is labelled both as it is emitted from the image source 340 and also as it exits the optical system 300. The remaining rays are stray rays, which are managed as follows. Rays in bundle 345 are reflected by the secondary mirror 350 back to the image source 340, which absorbs the rays. Rays in bundle 346 (between the solid ray and the dashed ray) are blocked by the obscuration 382. Stray rays in bundle 347 (between two dashed rays) exit the optical system but in a direction so that they do not overlap with the image-forming rays on the retina. These stray rays will sometimes be referred to as forming an unwanted "halo" away from the desired image formed by the image-forming rays 341. Rays in bundle 348 (between two dashed rays), which are emitted from the image source at relatively shallow oblique angles, are blocked by the sidewall 384. For clarity, only the righthand rays are marked in FIG. 3A, but a similar situation exists for the lefthand rays. An analogous situation occurs for rays emitted from the edge of the image source 340, as shown in FIG. 3B. The light baffle system preferably operates to reduce the stray rays exiting the system and to prevent any exiting stray rays from being projected to an area that overlaps with the projected image.

Although the obscuration in FIGS. 3A and 3B is absorbing and flat, it need not be. A reflective and/or non-flat obscuration will work as long as stray rays emitted from the image source that strike the obscuration are properly managed. They may be directed to absorbing structures or they may exit the optical system in a direction so that they do not overlap with the image on the retina. The obscuration also sharpens the focus of images on the retina and increases the depth of focus of those images. The increased depth of focus is helpful in a system designed to work with human eyeballs of various sizes and varying lens power.

FIG. 4 shows a perspective view of a femtoprojector optical system 300. The figure shows a transparent substrate 310 with primary mirror 360 and secondary mirror 350 formed on opposite ends, a clear mounting area 365 in the primary mirror for an image source, and an annular obscuration 382 surrounding the secondary mirror 350. An optional flat 412 on the circumference of the cylindrical substrate is also illustrated.

Design of femtoprojector optical systems described herein is complicated by constraints such as the very small volume in which the system must fit, refractive indices of the substrate and the surrounding contact lens material, required optical magnification specifications, luminous flux required at the retina given a low-power image source, and image sharpness and contrast. The size and curvature of the primary and secondary mirrors, the size and placement of the obscuration, the size of the clear area in the primary mirror, and the indices of refraction are all examples of parameters that may be adjusted by an optical designer to optimize different design priorities such as optical throughput, depth of focus, pixel size at the retina, and diffraction effects.

In some designs, the image source 340 is not more than 500 microns in size (b≤500 microns). For example, the image source 340 may be a 500×500 array of individually addressable emitters (LEDs), with an emitter-to-emitter pitch of not more than 3 microns and preferably not more than 1 micron. A 500×500 array with 1 micron pitch will be approximately 500 microns on a side. An array with 500× 500 color pixels, each of which has three different color LEDs, will be less than 1 mm on a side using 1 micron pitch. The femtoprojector optical system may provide a magnification of approximately 3-5× or up to 30× or more from the image source 340 to the user's retina. The resulting image projected on the user's retina may occupy a full field of view of approximately 5 degrees to approximately 20 degrees.

Figure 5A:
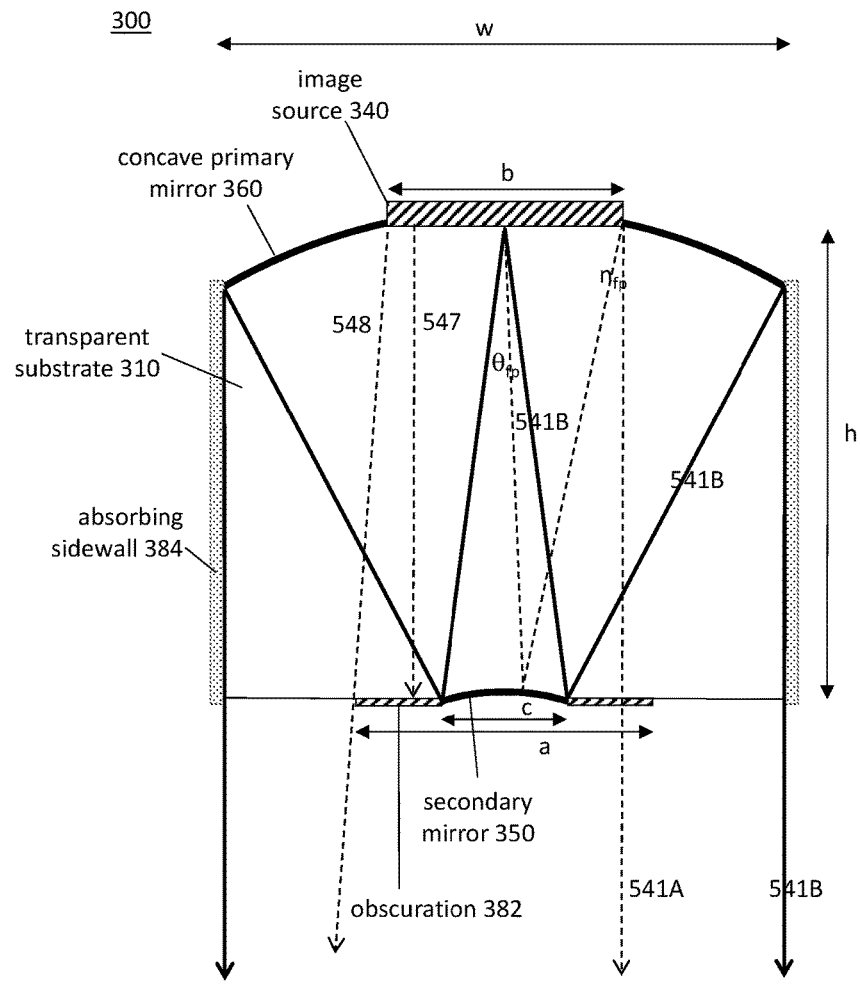
FIGS. 5A and 5B show cross sectional views of a femtoprojector optical system and an eye with a femtoprojector, illustrating design tradeoffs.
Figure 5B:
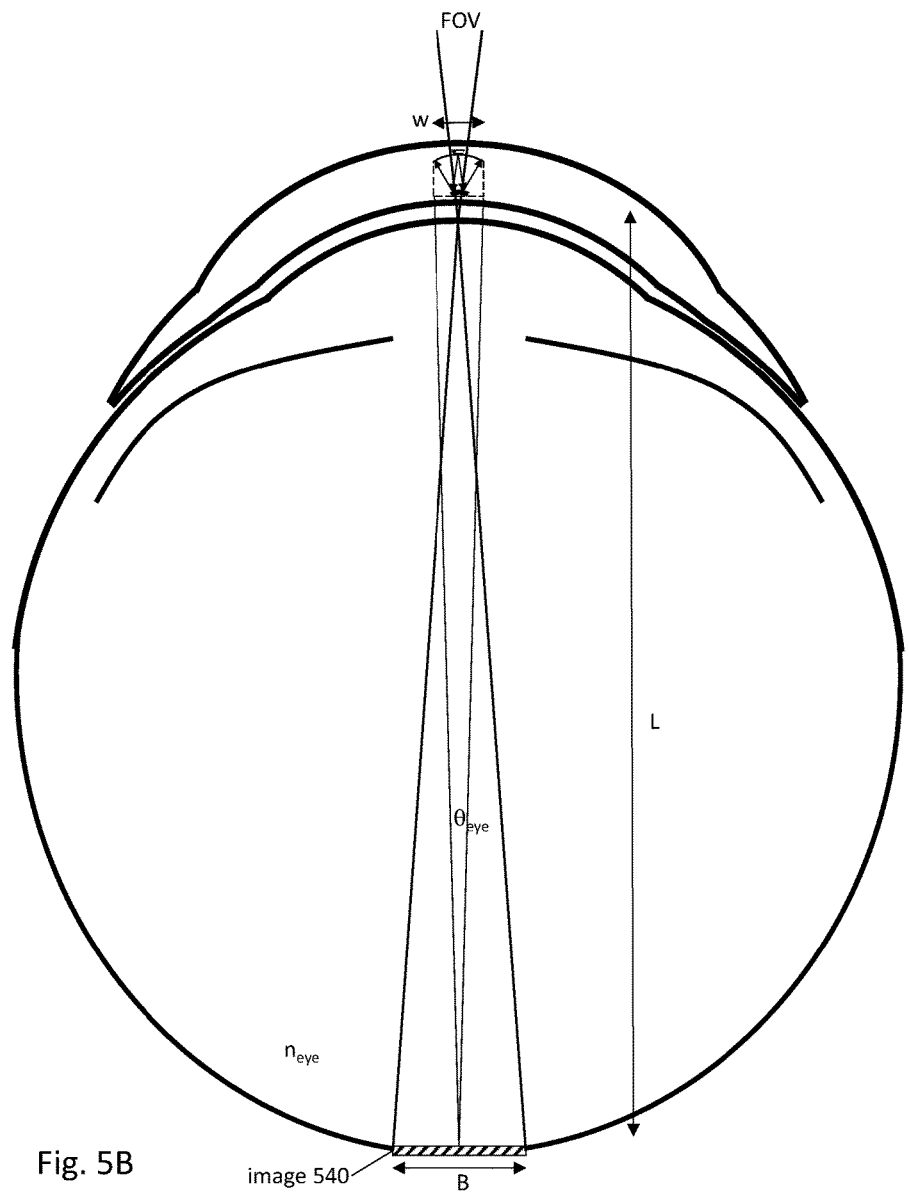
Figure 5C:
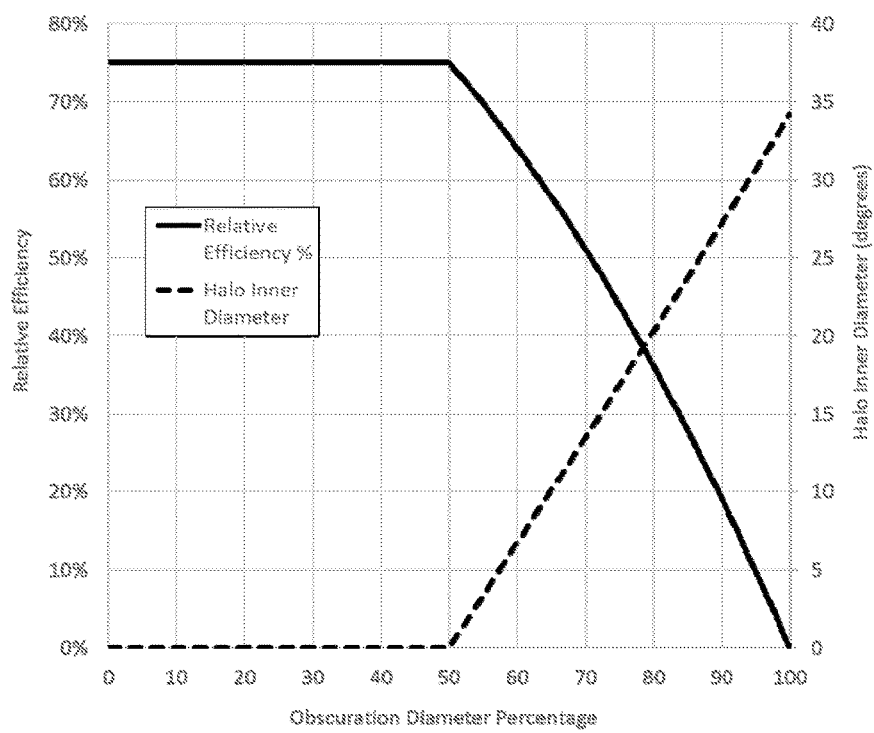
FIG. 5C plots relative efficiency and inner halo angle as a function of obscuration size.

FIGS. 5A-5C illustrate some design tradeoffs for the femtoprojector optical system. The following examples are simplified in order to illustrate the tradeoffs. For example, the small angle approximation will be used liberally, so that a=sin a=tan a, even though the angles considered may not be small in actual designs. More accurate calculations will be used when designing actual systems. FIG. 5A shows a cross-section of the femtoprojector optical system, where "b" is the size of the image source 340, "c" is the size of the secondary mirror 350 and "a" is the size of the obscuration 382. "w" is the width of the femtoprojector optical system (size of the primary mirror 360), and "h" is the height of the optical system (distance from image source 340 to secondary mirror 350). The substrate 310 has an index of refraction $n_{fp}$, where the subscript fp stands for femtoprojector.

The aspect ratio h:w of femtoprojector optical systems is preferably less than 2:1, and more preferably less than 1:1. The height, h, and width, w, are each preferably less than 2 mm, or even more preferably 1 mm or less. In the design shown, the image source 340 is axially aligned with the primary mirror 360. At the opposite end of the substrate 310, the secondary mirror 350 is axially aligned with the exit aperture. This approach results in the longest optical path length within the system for a fixed height h.

FIG. 5B shows the projection of the image source 340 onto the retina. The projected image 540 has a size B, so the overall magnification is given by m=B/b. The index of refraction of the eye (specifically, of the vitreous humor) is $n_{eye}$, which is approximately 1.34. L is the length of the eye, which is approximately 23 mm.

The following calculations are performed in one dimension and certain approximations (e.g., small angles) are made in order to illustrate various principles. They can be straightforwardly extended to two dimensions and more exact calculations can be made. For the moment, assume that the source size b, and femtoprojector height and width, h and w, are fixed. The eye size L and the indices of refraction are also fixed. This leaves the selection of the image size B, secondary mirror size, c, and obscuration size, a.

The image size, B, is determined by the desired field of view FOV according to $$B = (FOV/n_{eye})L = (L/n_{eye})FOV \quad (1)$$

where FOV is in radians. ($L/n_{eye}$) is a constant of proportionality approximately equal to 300 microns per degree field of view. An image spanning a 5 degree field of view would span approximately 1.5 mm on the retina.

The secondary mirror size, c, can be determined based in part on conservation of etendue. Setting the etendue at the image 540 equal to the etendue at the image source 340 yields $$n_{eye}B\theta_{eye}=n_{fp}b\theta_{fp} \quad (2)$$

where $\theta_{eye}$ is the cone angle of light focusing on the image 540, and $\theta_{fp}$ is the corresponding acceptance angle at the image source 340. Substituting B=(L/$n_{eye}$) FOV, $\theta_{eye}$=w/L and $\theta_{fp}$=c/h and solving for c yields $$c = \left(\frac{1}{n_{fp}}\right)\left(\frac{hw}{b}\right)FOV \quad (3)$$

where FOV is in radians. Note that c is the size of the secondary mirror that fulfills the condition that the etendue at the source image 340 matches the etendue at the retinal image 540 (ignoring the effects of the center hole in the primary mirror and the obscuration at the exit). For a given h, w, b and FOV, increasing the size of the secondary mirror beyond this value of c will not increase the amount of light forming the retinal image. Note that this value of c scales as h*w*FOV/b. For constant h, w and b, the secondary mirror size scales with FOV. Assuming h=750 microns, w=1000 microns, b=500 microns, and $n_{fp}$=1.34 yields a constant of proportionality of 20 microns per degree field of view. For a 5 degree field of view, the corresponding secondary mirror size would be c=100 microns.

The size, c, of the secondary mirror 350 is also related to the sizes of the image source 340 and primary mirror 360 with respect to passing image-forming rays and blocking stray rays. Assume that the primary mirror 360 extends from the edge of the image source 340 out to the radius w/2. The edge of the secondary mirror 350 is defined by the ray 541B, as shown in FIG. 5A.

For the special case where c=b, the secondary mirror 350 and the image source 340 are the same size. Substituting c=b in Eqn. 3 and solving for FOV yields $$FOV = n_{fp}\left(\frac{b^2}{hw}\right) \quad (4)$$

where FOV is in radians. Continuing the example from above where h=750 microns, w=1000 microns, b=500 microns, and $n_{fp}$=1.34, the case c=b would occur at a FOV of approximately 25 degrees.

For smaller fields of view, the secondary mirror 350 can be much smaller than the image source 340 without sacrificing etendue. In this case, without a larger obscuration 382, most of the forward-emitted light from the image source (such as ray 547) would overlap the image 540 at the retina, reducing the image contrast.

Therefore, if c<b, it is preferable that the obscuration 382's inner edge is adjacent to the secondary mirror 350's outer edge, and that the obscuration 382's outer edge has a size, a, that is at least a=b. As the obscuration 382 grows from size a=0 to a=b, it does not block any image-forming rays (at least, none from the center point of the image source 340) and blocks only stray rays. At a size of a=b, the obscuration 382 blocks all axially-propagating stray rays, i.e., stray rays that propagate parallel to the optical axis of the system, such as ray 547. If left unblocked, these rays typically would overlap with the projected image 540, so blocking them is beneficial. However, as the obscuration increases in size beyond a=b, it will block additional image-forming rays in addition to additional stray rays, as shown in FIG. 5. Thus, there is a tradeoff between maintaining contrast in the image and reducing stray light exiting the system.

For larger fields of view where c>b, even without an obscuration 382, all axially-propagating stray rays would be reflected by the secondary mirror (and presumably blocked), so the center of the image would be free of these stray rays. Away from the center of the image, there might still be stray light reducing image contrast, unless an obscuration 382 is provided that has an even larger size than the secondary mirror 350.

Assuming the obscuration 382 is larger than the image source, the stray ray defining the inner edge of the halo (i.e. the innermost angle of the annulus formed by the unreflected, unblocked emitted light) is the ray 548 emitted from the edge of the image source 340 and just clearing the obscuration 382, as shown in FIG. 5A. This ray 548 is propagating at an angle $$\phi=(a/2-b/2)/h \quad (5)$$

For convenience, angle φ will be referred to as the inner halo angle. In order to ensure that this ray stays outside the image 540, the obscuration size, a, is selected such that the inner halo angle φ>FOV/(2 $n_{fp}$). Substituting for φ and solving for a yields $$a \geq b+FOV(h/n_{fp}) \quad (6)$$

As the obscuration 382 increases in size, the inner edge of the halo is pushed farther away from the image. In addition, the outer edge of the halo is typically limited by either the eye's pupil or the outermost edge of the femtoprojector. Accordingly, the total power in the halo is reduced as the obscuration size is increased.

However, increasing the obscuration size also reduces the total power in the image. Consider just the center pixel of the image source 340. Let P be the total power emitted from this pixel within the acceptance angle $\theta_{fp}$ as defined above and assume that this power is uniformly distributed. If a<b, then the hole in the primary mirror 360 caused by the image source 340 blocks a fraction of the light roughly equal to $(b/w)^2$. If a>b, then the obscuration 382 will dominate and block a fraction of the light roughly equal to $(a/w)^2$. The relative efficiency can be defined as the inverse of this:

relative efficiency=1−fraction of light that is blocked  (7)

FIG. 5C plots the relative efficiency and the inner halo angle as a function of obscuration size (measured relative to the femtoprojector size). FIG. 5C continues the previous example where w=1000 microns and b=500 microns, so b/w=50%. The solid line plots relative efficiency given by Eqn. 7 as a function of (a/w) which is the obscuration size relative to the femtoprojector size. For values of (a/w)<50%, the relative efficiency is 75% (25% loss) because the loss is determined by the hole in the primary mirror created by the image source (b/w=50%). For values of (a/w)>50%, the increasing size of the obscuration reduces the relative efficiency until it reaches 0% when the obscuration covers the entire exit area.

The dashed line plots the inner halo angle $\phi$ given by Eqn. 5 as a function of (a/w). For values of (a/w)<50%, the obscuration is smaller than the image source so some axially-propagating stray rays will exit the system, yielding an inner halo angle $\phi$=0 degrees. For values of (a/w)>50%, the increasing size of the obscuration pushes the halo farther away from the image.

FIGS. 6-13 show additional embodiments of femtoprojector optical systems involving internal refractive interfaces, obscuration position and shape, and other parameters. The design choices are necessarily illustrated in combinations and, to keep the number of figures under control, not every possible combination is shown. For example, the choice of shape of internal refractive interface is largely independent of the choice of obscuration location or obscuration shape. Some combinations of those choices are illustrated. Those skilled in the art will appreciate that other, unillustrated combinations may be desirable in certain situations.

Figure 6:
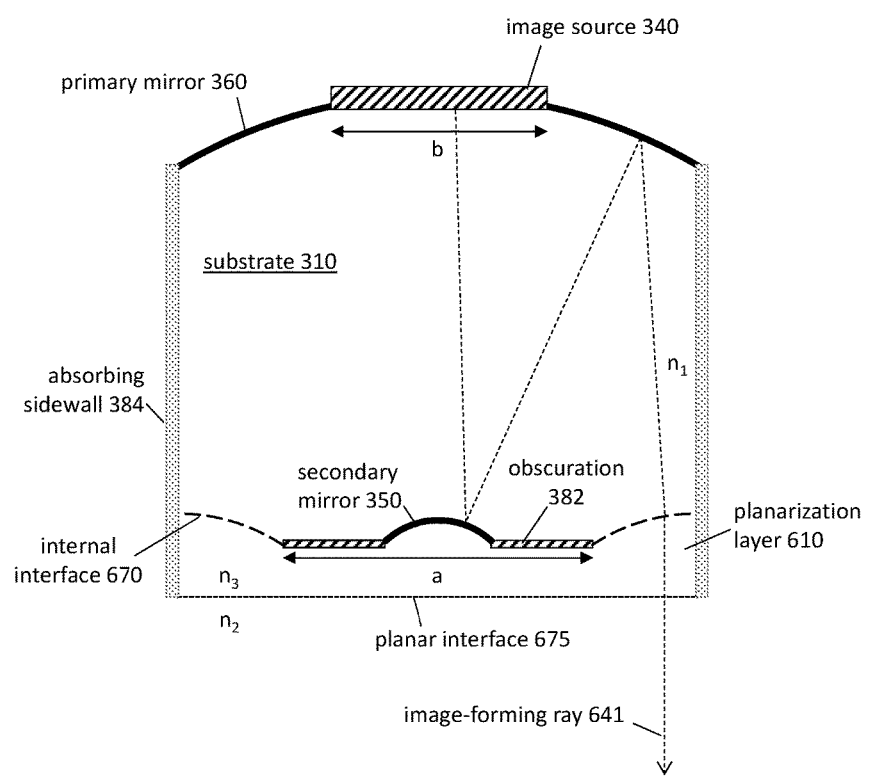
FIGS. 6-13 show cross sectional views of various femtoprojector optical systems.

In FIG. 6, after being reflected by the primary mirror 360, image-forming rays 641 first cross a boundary 670 between index $n_1$ material and index $n_3$ material in the femtoprojector optical system, and then cross a boundary 675 between index $n_3$ material and index $n_2$ (contact lens) surroundings. These boundaries (and any boundary between one transparent medium and another) are called "refractive interfaces." Refractive interfaces may be curved, flat or have more complicated shapes.

In FIG. 6, and in other examples described below, the internal refractive interface 670 between $n_1$ and $n_3$ may be curved or flat, while the external refractive interface 675 between $n_3$ and $n_2$ preferably is flat. The $n_3$ material is therefore sometimes referred to as a planarization layer 610. It provides a planar interface 675 between the femtoprojector optical system and its surroundings. The profile of the refractive interface between $n_1$ and $n_3$ allows an optical designer to make adjustments to the performance of the optical system. In FIG. 6, the internal interface 670 is curved. The value of indices $n_1$ and $n_3$, and the shape of the boundary between them, all affect projected image quality. However, the planar interface 675 between $n_3$ and $n_2$ makes the system relatively insensitive to small changes in $n_2$.

Figure 7:
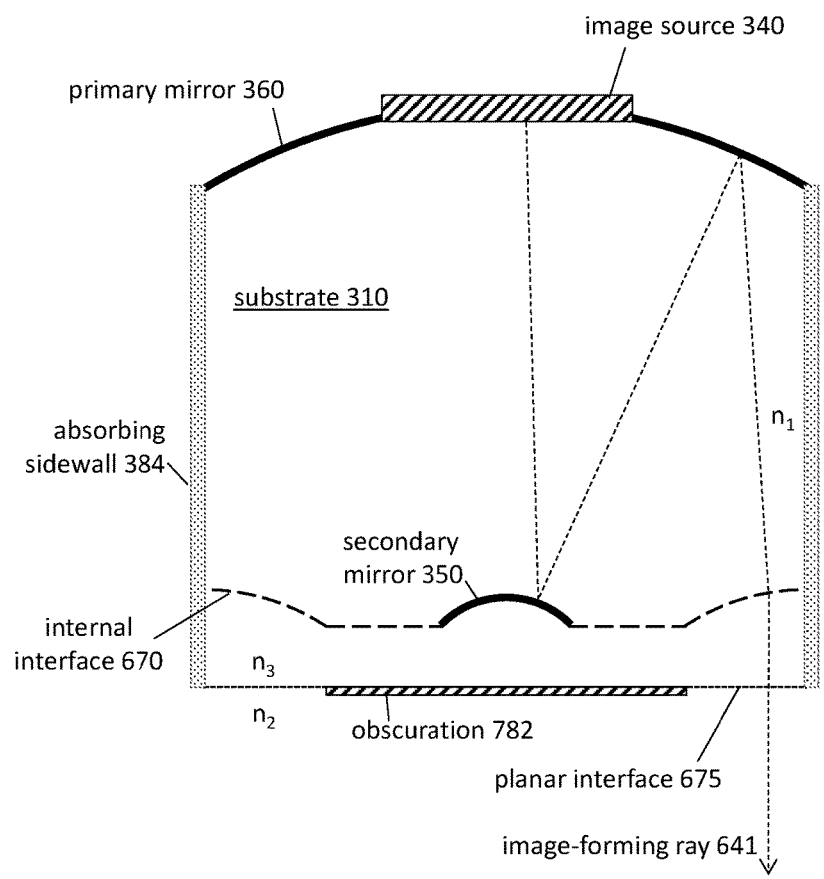

The femtoprojector optical system of FIG. 7 is similar to that of FIG. 6. However, in FIG. 7 the obscuration 782 is placed on the surface of the planar refractive interface 675, rather than surrounding the secondary mirror 350. It is axially offset from the secondary mirror 350. In FIG. 7 the obscuration 782 physically covers a circular area, although optically it has similar effect as an annular obscuration. Preference for the design of FIG. 7 versus that of FIG. 6 is driven in part by manufacturing techniques. Applying an obscuration material 782 to the planar refractive interface 675 may be preferable to forming a planarization layer over an obscuration material located on the internal interface 670, for example. Furthermore, a reflective layer may be formed over the obscuration 782 (e.g. deposited after the obscuration) to reflect any light that passes through the obscuration back through its absorptive layer.

Figure 8:
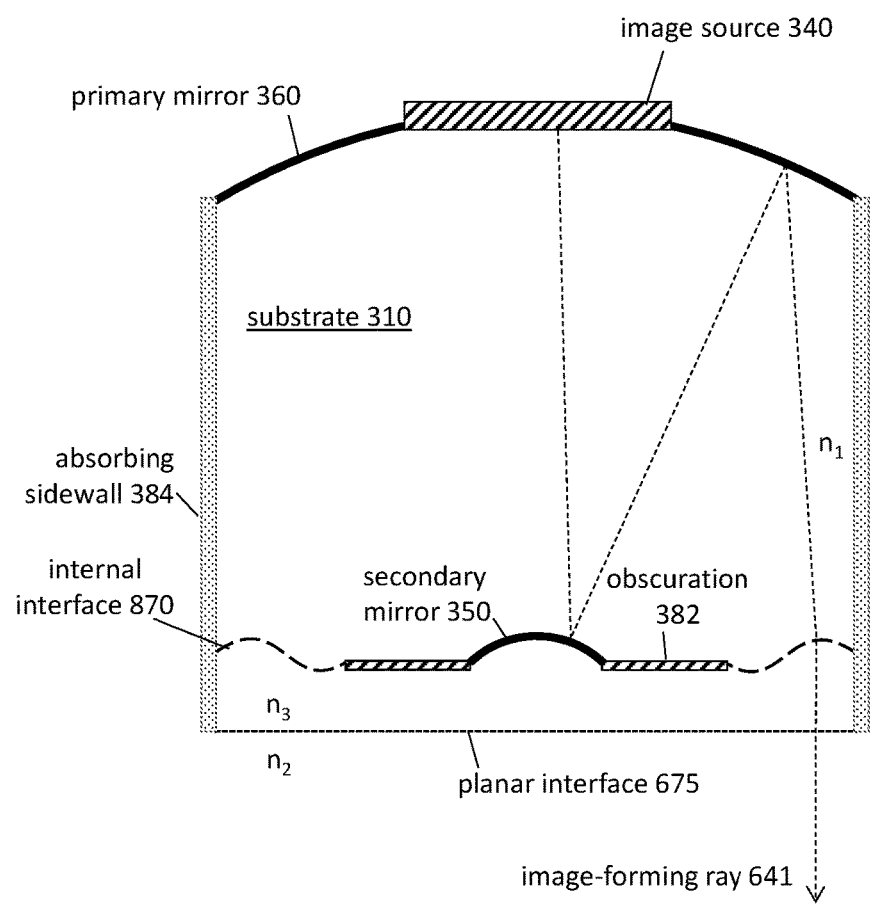

In the femtoprojector optical system of FIG. 8, the internal refractive interface 870 between index $n_1$ material and index $n_3$ material has a more complex, higher order shape. The shape of the internal refractive interface 870 is a design parameter that is used to optimize image quality to a higher level that what is possible via primary and secondary mirror shape alone. The shape of the internal refractive interface 870 may be described by a polynomial expansion in radius with a set of coefficients. Although it is illustrated as being approximately in the same plane as the secondary mirror and the obscuration, the internal refractive interface may be axially displaced either closer to, or farther away from, the primary mirror 360.

Figure 9:
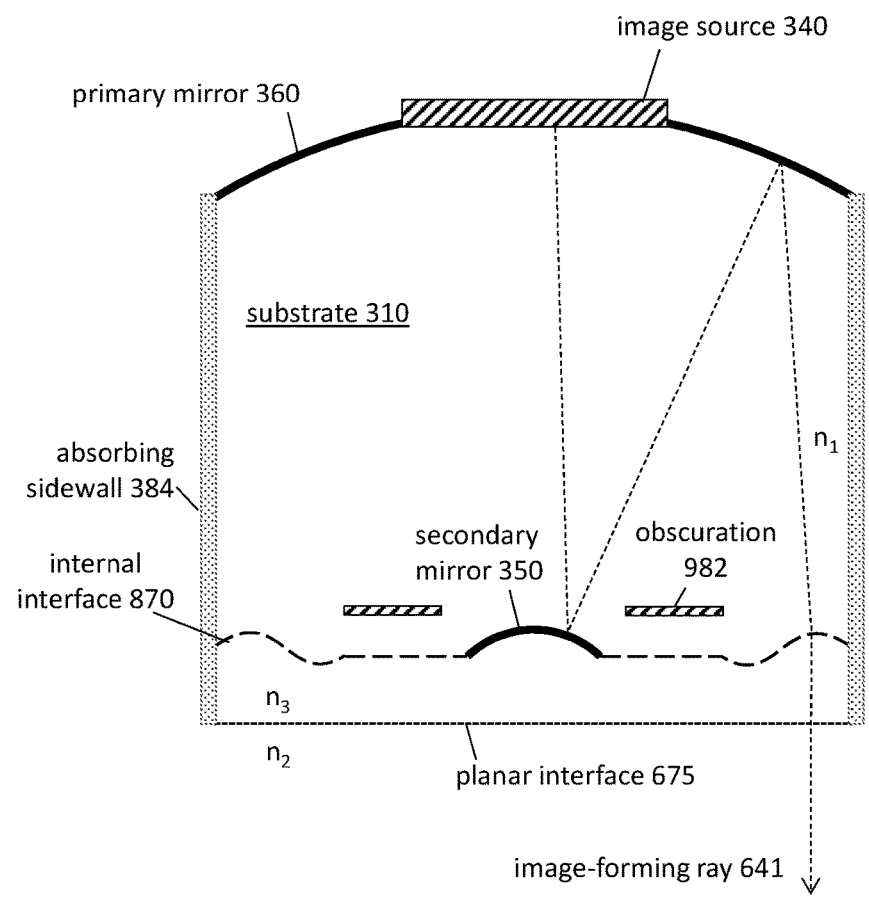

In the femtoprojector optical system of FIG. 9, the annular obscuration 982 is axially offset from the secondary mirror 350. It is positioned closer to the primary mirror 360 than is the secondary mirror 350. Preference for this placement of the obscuration is mainly driven by manufacturing techniques rather than optical performance. Forming an obscuration in the middle of the solid transparent substrate is convenient in some manufacturing process flows described below.

Figure 10:
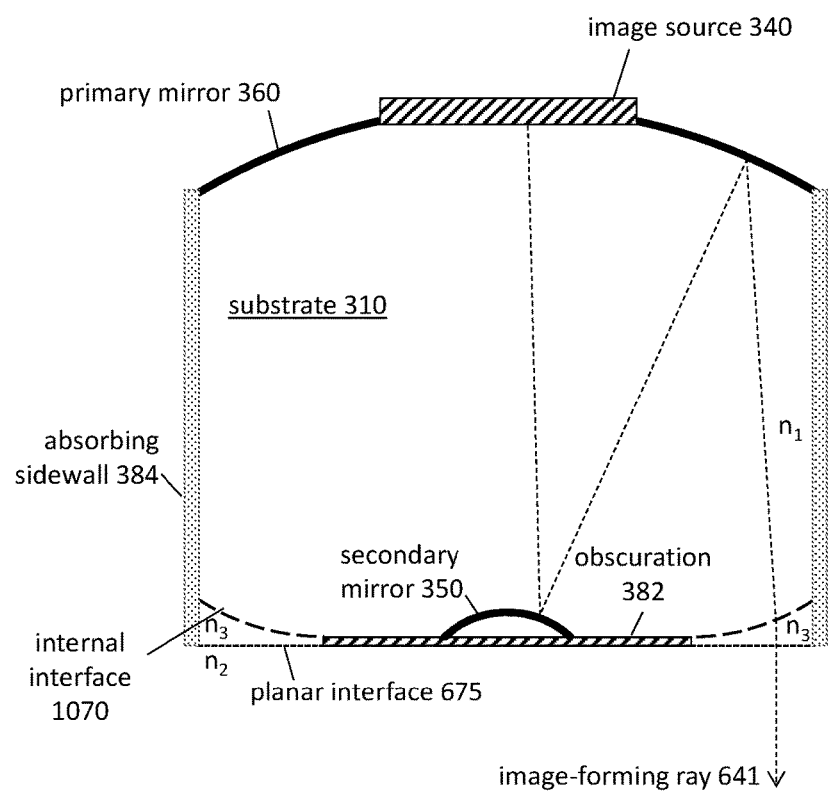

FIG. 10 shows a femtoprojector optical system with an internal refractive interface 1070 curved opposite to that of FIG. 6. Conceptually the choice of convex, concave or complex curved refractive interface 1070 may be thought of as being determined by whether a positive, negative or more complicated correction to the optical effects of the primary and secondary mirrors is desired. The system of FIG. 10 also has a planar refractive interface formed coplanar (or nearly so) with an obscuration 382 and secondary mirror 350. Preference for this arrangement is again mainly a matter of manufacturing choice. The planar refractive interface 675 may be a thin window, for example, and the $n_3$ index material may be a curable or moldable material, or a gas, such as nitrogen or air, or a liquid, such as a liquid crystal.

Figure 11:
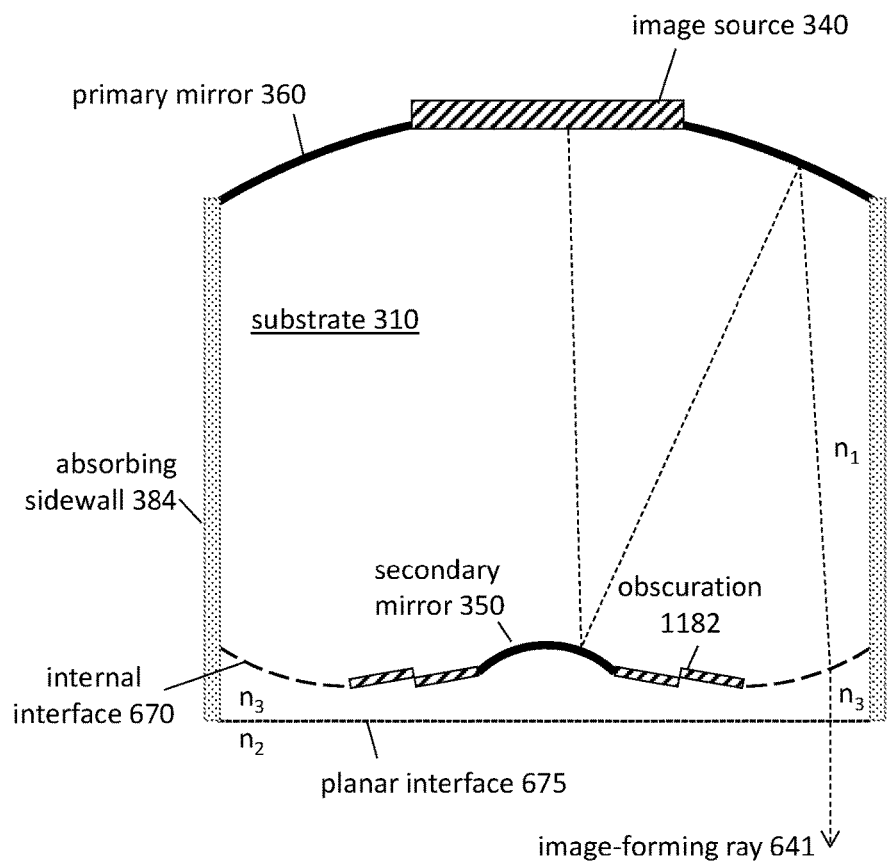

The system of FIG. 11 has an obscuration 1182 that is sloped away from the image source and broken into segments reminiscent of a Fresnel lens. The segments may be curved. The obscuration 1182 is sloped so that light from the image source 340 that is reflected from the obscuration is redirected toward the absorbing sidewalls 384 rather than the primary mirror 360. A redirecting obscuration 1182 therefore need not be made from an absorbing material. It may be a reflector and may be fabricated simultaneously with the secondary mirror 350, for example. The obscuration 1182 may be made as one, continuous slope. However, breaking it up into segments as shown in the figure reduces the overall length of the optical system. Only two segments are shown in the figure, but the obscuration 1182 may be broken into many segments if desired.

Figure 12:
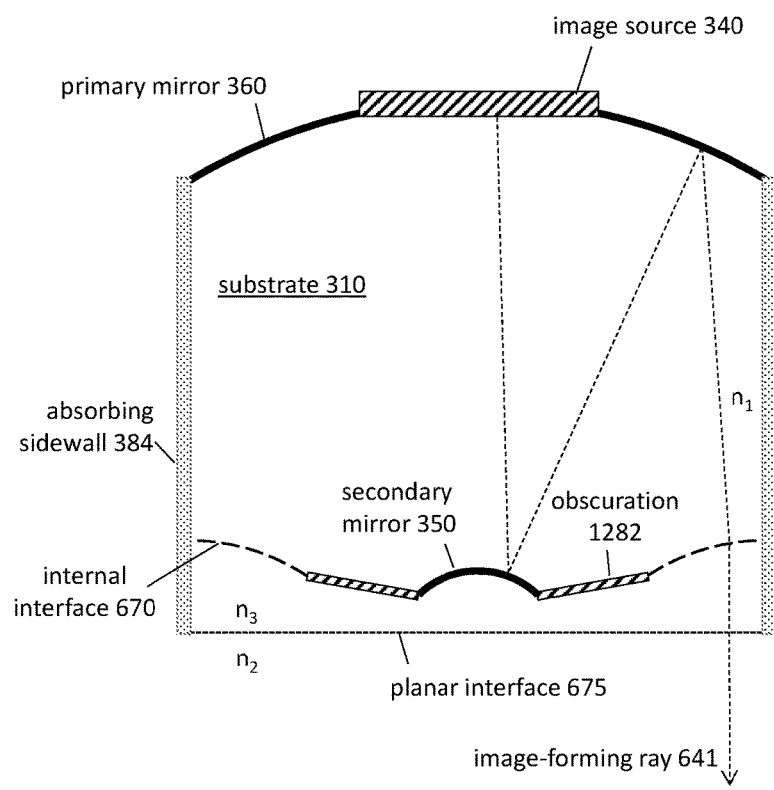

The system of FIG. 12 has a sloped obscuration 1282 that slopes the opposite way (towards the image source) compared to the obscuration of FIG. 11. The obscuration in FIG. 12 is not broken into segments, but it could be if desired. The obscuration 1282 of FIG. 12 is sloped so that light from the image source 340 that is reflected from the obscuration is redirected toward absorbing sidewalls 384 rather than the primary mirror 360, but to the opposite absorbing sidewalls rather than to the adjacent absorbing sidewalls as in FIG. 11. In FIG. 11, the stray rays that strike the right-side obscuration 1182 are reflected to the right-side absorbing sidewall 384. In FIG. 12, the stray rays that strike the right-side obscuration 1282 are reflected to the left-side absorbing sidewall 384. The obscuration 1282 need not be made from an absorbing material. It may be a reflector and may be fabricated simultaneously with the secondary mirror, for example.

Figure 13:
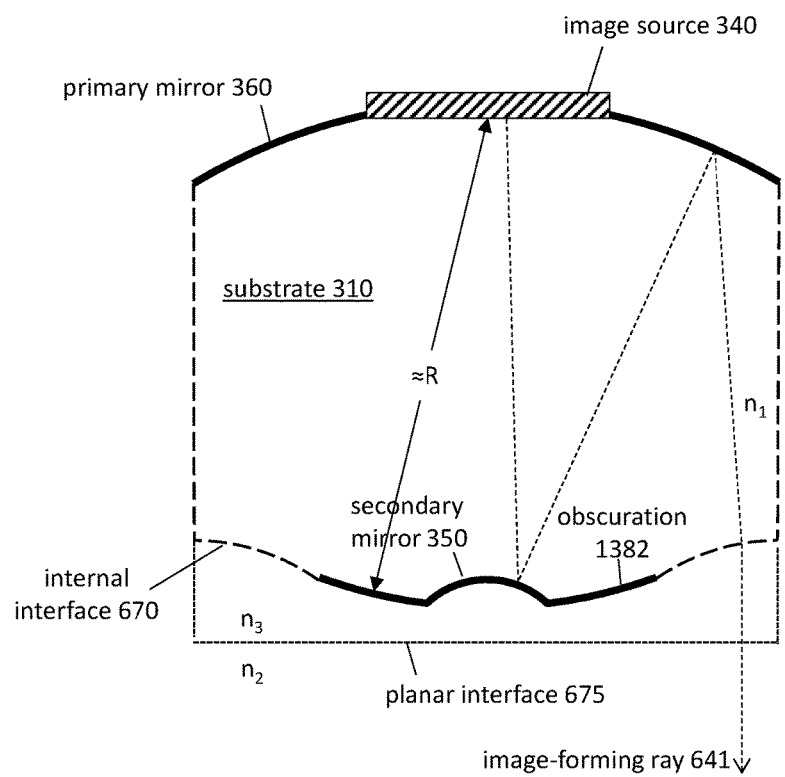

The system of FIG. 13 has a curved obscuration 1382. The obscuration 1382 in FIG. 13 is a concave mirror that has a radius of curvature, R, approximately equal to the distance from the obscuration to the image source 340. Light rays from the image source 340 that are incident upon the curved obscuration 1382 are reflected back to the image source where they are absorbed. If the obscuration 1382 directs light back to the light source accurately enough and if the light source is an effective enough absorber, then it may not be necessary for the optical system to have absorbing sidewalls. Hence, no absorbing sidewalls are shown in the figure.

Obscuration radius of curvature R need not be exactly equal to the distance between the obscuration 1382 and the image source 340 as long as the combination of the curved, reflective obscuration and the absorbing image source blocks enough stray light to ensure a desired level of image contrast. Thus R is a design parameter that may be optimized for a particular situation. Furthermore R may be approximately equal to the distance between the obscuration and the primary curved mirror surface if that surface coincides with the image source. An obscuration 1382 may also be made having an aspheric surface.

FIGS. 6-13 illustrate various configurations of internal refractive interface, planar refractive interface and obscuration. The internal refractive interface permits design adjustments to the overall optical system. The planar interface reduces the sensitivity of the optical design to changes in the index $n_2$ of surrounding material such as a contact lens. The obscuration prevents light that is not reflected by the secondary mirror from reducing image contrast. A tilted obscuration may be reflective rather than absorbing as long as it directs light toward an absorbing sidewall, another absorbing surface, or away from a desired image in any case. A tilted obscuration may be broken into segments. A curved obscuration may be reflective and may eliminate the need for absorbing sidewalls. A curved obscuration may also be broken into segments.

The style (curved, flat, sloped, segmented) chosen for the obscuration is typically independent of the characteristics of the internal refractive interface. Furthermore, all of the different types of obscuration described herein are suitable for use in optical systems that do not have an internal refractive interface.

Figure 14A:
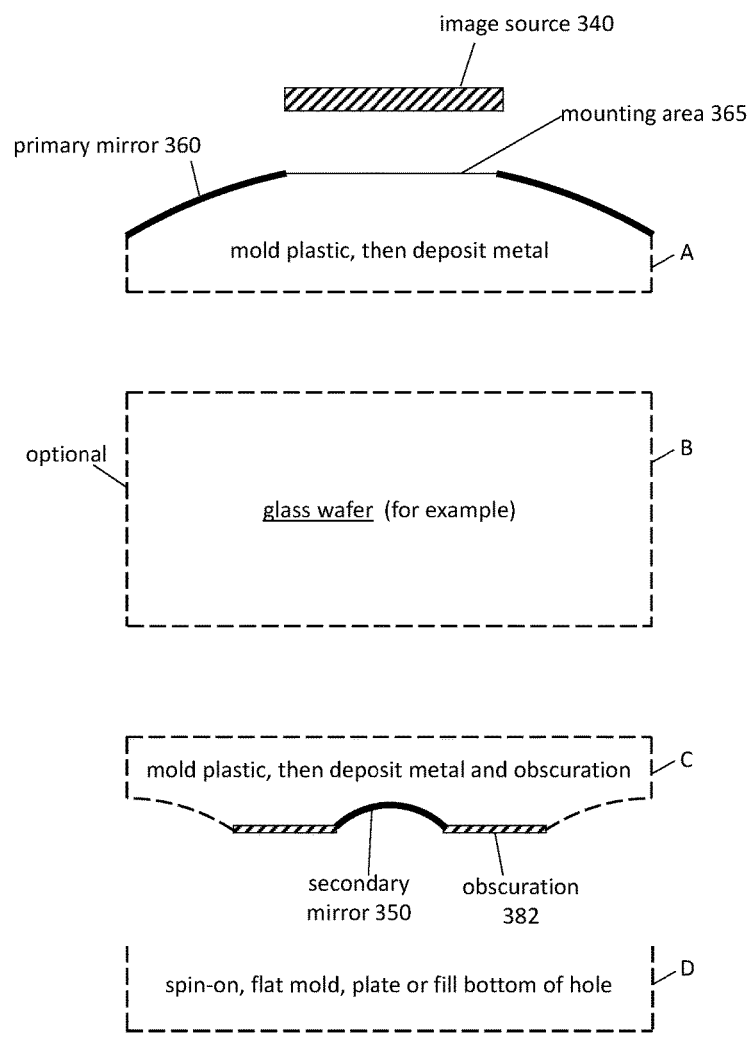
FIGS. 14A-14B show an exploded view and an assembled view of a femtoprojector.
Figure 14B:
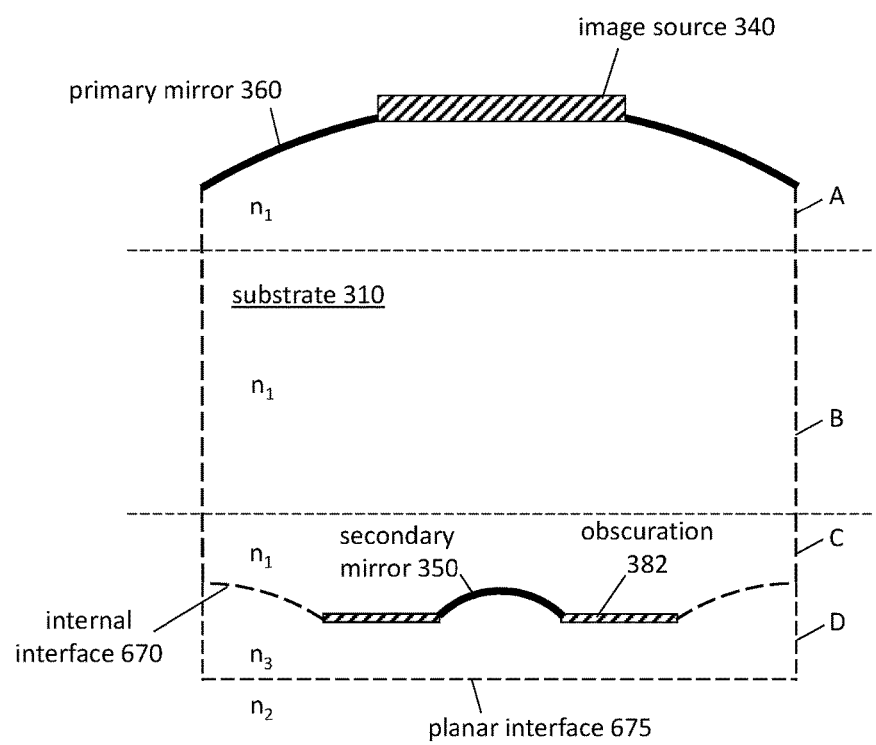

FIGS. 14 and 15 illustrate various methods for fabricating femtoprojector optical systems. FIGS. 14A-14B show exploded and assembled views, respectively, of a system like that shown in FIG. 6. FIG. 14A shows an exploded view of a femtoprojector optical system in four parts: A, B, C and D.

Part A in FIG. 14A may be molded in plastic and then coated with metal to form a primary mirror structure 360. A light source 340 such as an LED array may be integrated onto the mount area 365 after the optical system is complete. Part B may be a glass or plastic wafer. Part B is optional. If it is omitted, Parts A and C may be made thicker to compensate. On the other hand, Part B may be a convenient starting substrate onto which Parts A and C may be formed by stamping moldable plastic. Part C may be made using a process similar to that used for Part A. Metal deposited on Part C forms a secondary mirror 350. An absorbing material deposited on Part C forms an obscuration 382. Alternatively, if the obscuration is made tilted (see e.g. FIGS. 11 and 12), then the same metal that forms the secondary mirror may also form the obscuration. Finally, Part D, a planarizing layer, may be molded, plated or spun on top of Part C. It may also be created by filling the bottom of a hole into which the rest of the structure is inserted, or the hole may be left empty or filled with gas. FIG. 14B shows an assembled view of a femtoprojector optical system made from Parts A-D.

Figure 15A:
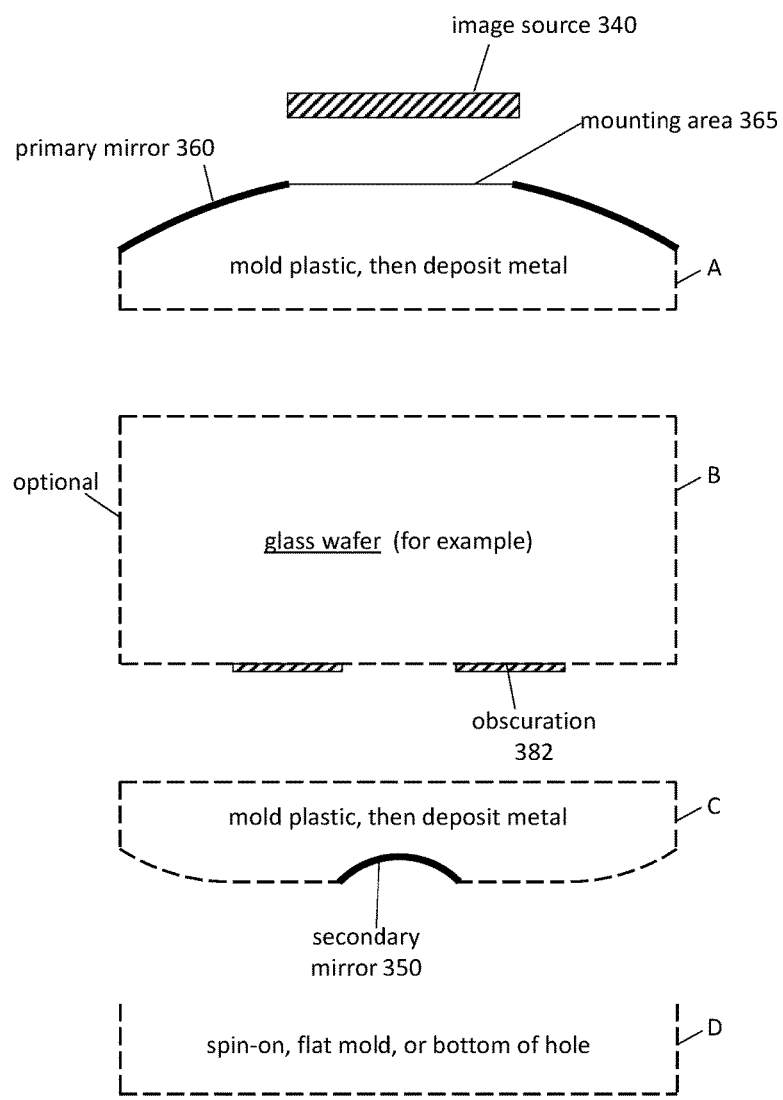
FIGS. 15A-15B show an exploded view and an assembled view of another femtoprojector.
Figure 15B:
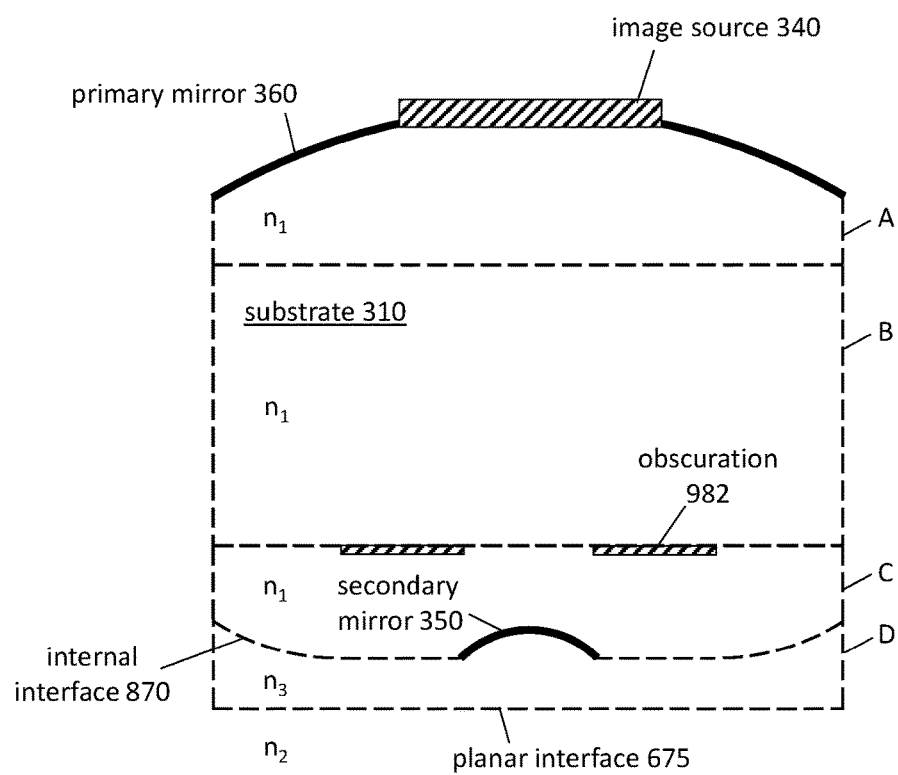

FIGS. 15A-15B show exploded and assembled views, respectively, of a system that is a combination of the systems shown in FIGS. 9 and 10. FIG. 15A shows an exploded view of a femtoprojector optical system in four parts: A, B, C and D. These parts may be fabricated using the same techniques described for corresponding parts in FIG. 14. The main differences between FIGS. 14 and 15 are that in FIG. 15A, the obscuration is formed on Part B. This may be done by depositing and patterning an absorbing material on Part B. Also, in FIG. 15A, the internal refractive interface formed between Parts C and D curves the opposite way. Of course a complex curve could have been formed instead. In FIGS. 14 and 15, "Part D" may be formed by the bottom of a hole drilled in a rigid gas permeable contact lens and filled with an appropriate optical epoxy. FIG. 15B shows an assembled view of a femtoprojector optical system made from Parts A-D of FIG. 15A.

Figure 16:
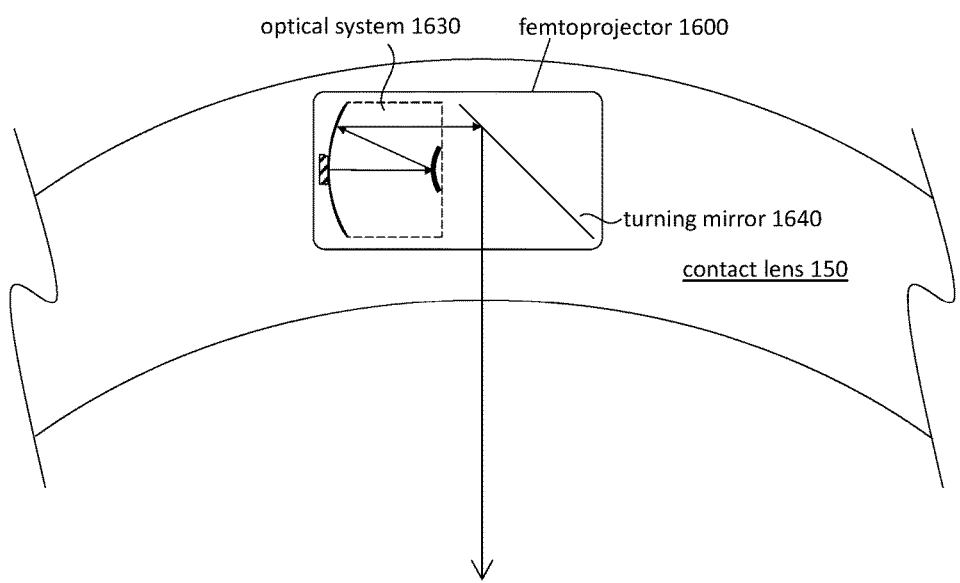
FIG. 16 shows a cross sectional view of a horizontally positioned femtoprojector in a contact lens.

In FIG. 1 a femtoprojector is shown mounted in a contact lens in a "vertical" configuration. Said another way, the optical axis and/or axis of symmetry of the femtoprojector 100 is approximately perpendicular to the outer surface of the contact lens 150. FIG. 16 shows a cross sectional view of a femtoprojector in a contact lens. In FIG. 16, the femtoprojector 1600 is mounted in a "horizontal" configuration, meaning that the optical axis and/or axis of symmetry of the femtoprojector optical system 1630 is approximately parallel to the outer surface of the contact lens 150. In this configuration, a turning mirror 1640 directs image-forming rays from the femtoprojector optical system 1630 toward a user's retina.

Figure 17:
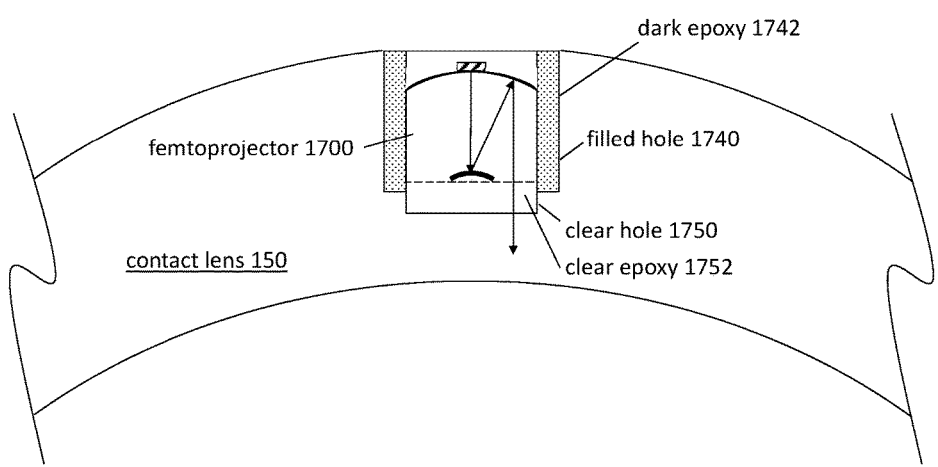
FIG. 17 shows a cross sectional view of yet another femtoprojector in a contact lens.

FIG. 17 shows a cross sectional view of yet another femtoprojector 1700 in a contact lens 150. The assembly of FIG. 17 is made as follows. A first hole 1740 is drilled (or otherwise created) in a contact lens 150, such as a rigid gas permeable lens. Next, the hole 1740 is filled with dark colored epoxy 1742 (Master Bond EP42HT-2MED Black, for example). This is the filled hole 1742. Next, another hole 1750, concentric with the first but smaller diameter and deeper, is drilled or otherwise created. This is the clear hole 1750. Finally a femtoprojector 1700 is inserted into the clear hole 1750. Clear, index-matched epoxy 1752 may be placed in the bottom of the clear hole 1750. The dark colored epoxy 1742 left from the filled hole operation serves as the absorbing sidewall for the femtoprojector as illustrated above. The bottom of the clear hole 1750 may be filled with clear epoxy 1752 and may form Part D of FIGS. 14-15. This assembly method may be referred to as "drill—fill—drill". Materials other than epoxy can be used, and the first hole 1740 need not be filled. Its sides could be coated instead, for example.

FIGS. 18-27 illustrate additional femtoprojector optical system designs including, among other things, different structures for controlling stray light rays.

Figure 18:
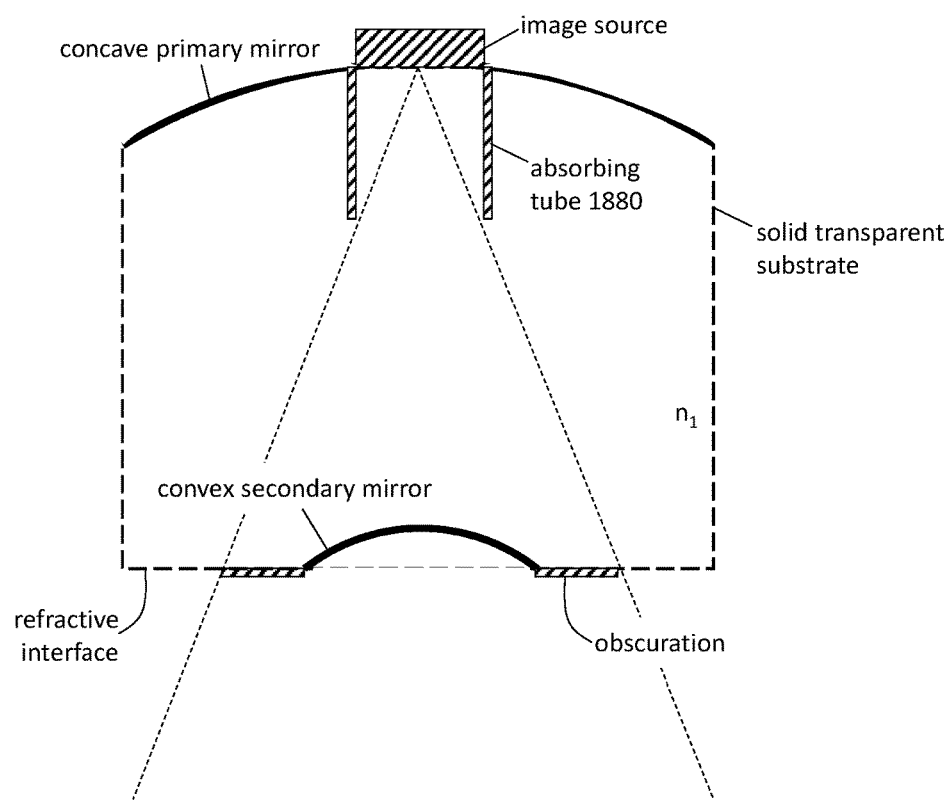
FIGS. 18-20 show cross sectional views of femtoprojector optical systems with different types of source baffles.

FIG. 18 shows a femtoprojector optical system with an annular obscuration and an internal absorbing tube 1880. The internal absorbing tube 1880 is shown in cross-section in FIG. 18, but in three dimensions it is an empty cylinder with light absorbing walls. The tube may also have a rectangular or other shape cross-section to match the shape of the image source. The absorbing tube 1880 blocks rays from the image source from exiting the system without first being reflected by the primary mirror. As such, it is part of the light baffle system. It immediately reduces the divergence of rays produced by the image source, as shown by the two dashed lines, and therefore may be referred to as a source baffle. If the divergence is sufficiently reduced, then side baffles may not be required. The absorbing tube 1880 may be machined in a solid transparent substrate by diamond turning. Alternatively, the absorbing tube 1880 may be hot pressed into the solid transparent substrate. The cylindrical cut thus formed may then be filled with an absorbing material such as carbon, roughened nickel, Vantablack, etc.

Alternatively, a substrate with a narrow, cylindrical end having the size of the desired tube 1880 may be made first. Then the cylindrical end may be coated with an absorbing material such as carbon, roughened nickel, Vantablack, etc. to form a tube 1880. Finally, transparent material may be added around the absorbing tube 1880 to complete the transparent substrate as shown in the figure.

Figure 19:
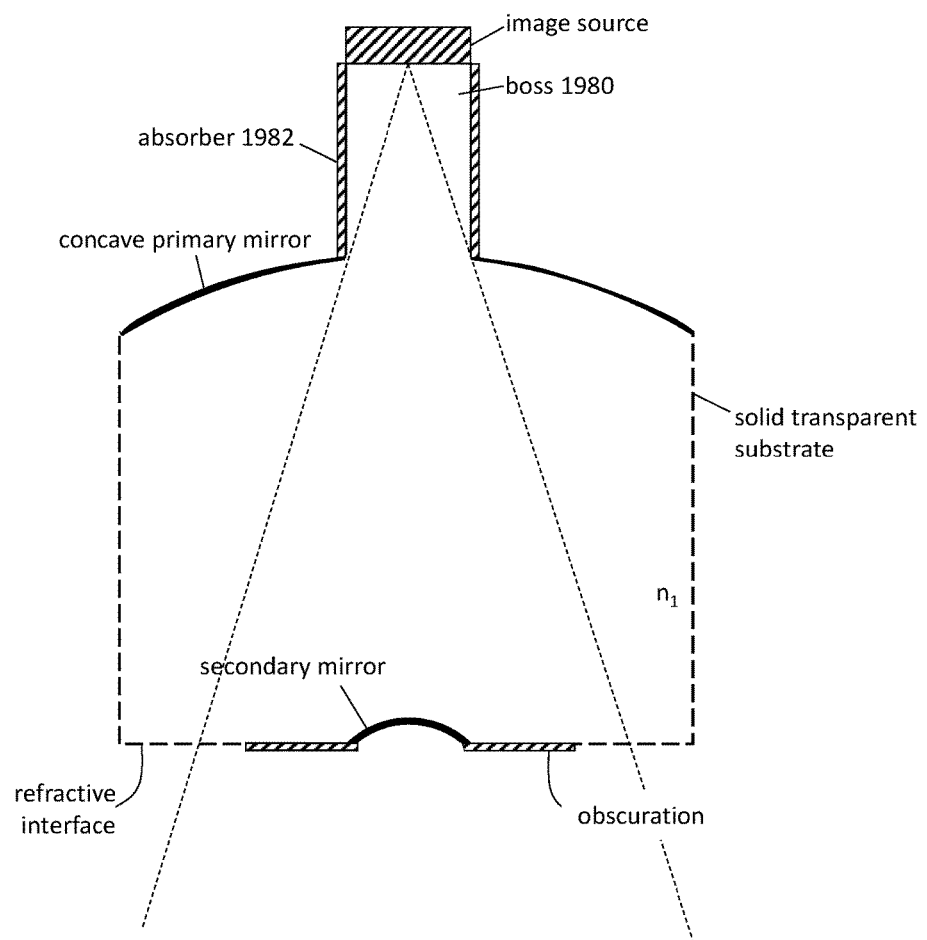

FIG. 19 shows a femtoprojector optical system with an annular obscuration and displaced image source. The system of FIG. 19 includes a "boss" 1980 to support a displaced image source, and an absorber 1982 surrounding the boss.

The boss 1980 is shown in cross-section in FIG. 19, but in three dimensions it is a solid cylinder with a light absorbing sidewall 1982. The absorber 1982 blocks rays from the image source from exiting via the refractive interface without first being reflected by the primary mirror. The absorber 1982 is another type of source baffle.

Starting from a solid, transparent substrate, a boss 1980 may be made in one end of the substrate as shown in the figure by turning on a lathe. Alternatively, the boss 1980 may be a feature in a mold in an injection molding process. The boss 1980 may be coated with an absorbing material such as carbon, roughened nickel, Vantablack, etc.

Figure 20:
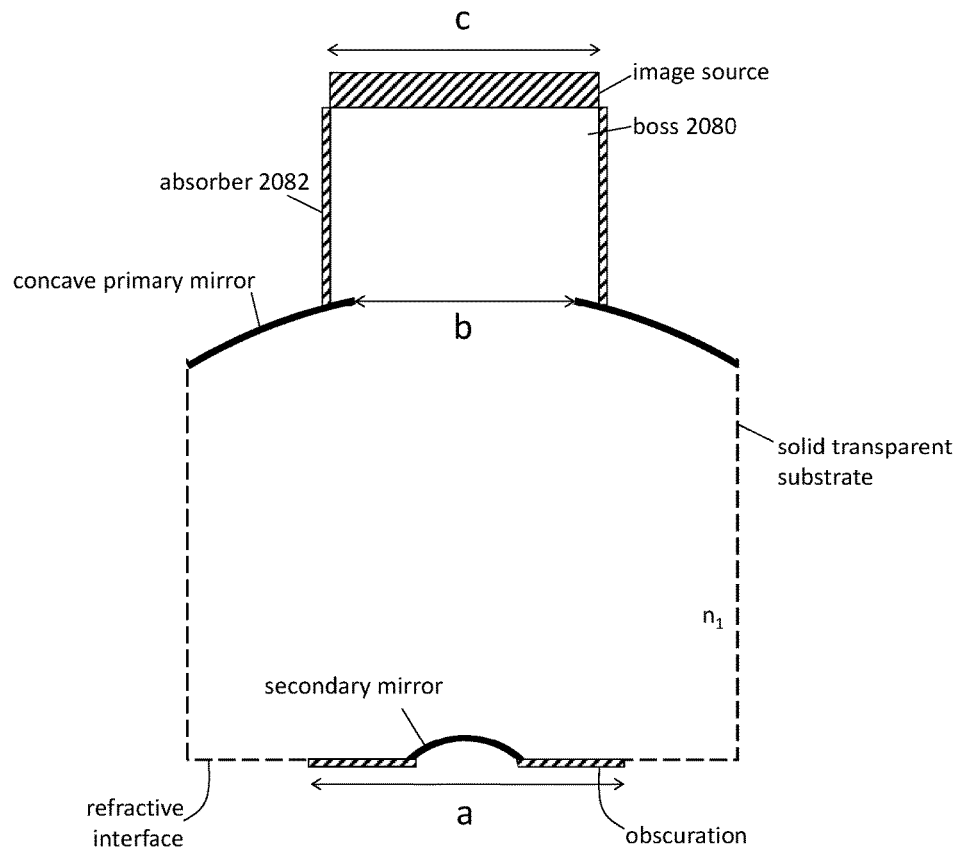

FIG. 20 shows a femtoprojector optical system with an annular obscuration and displaced image source that is larger than an opening in the primary mirror. The system of FIG. 20 is similar to that of FIG. 19. However, in FIG. 20 the size "c" of the image source is greater than the size "b" of the clear opening in the primary mirror. The size "a" of the obscuration is also greater than "b". Briefly, a>b and c>b. Also, a≤c is acceptable as long as a>b. The size of the clear opening is large enough that rays from any part of the image source illuminate the secondary mirror.

The boss 2080 in FIG. 20 includes a light absorbing sidewall 2082. It may be made by any of the methods described for fabricating the boss shown in FIG. 19. However, additional steps may be necessary to make the structure of FIG. 20 because the boss 2080 is larger than the size of the clear opening in the primary mirror. The boss 2080 may be tapered, by diamond turning for example, such that the diameter of the boss varies from "c" at the image source to "b" at the primary mirror. That way the substrate is exposed so that reflective material may be deposited to form the entire primary mirror surface.

Figure 21:
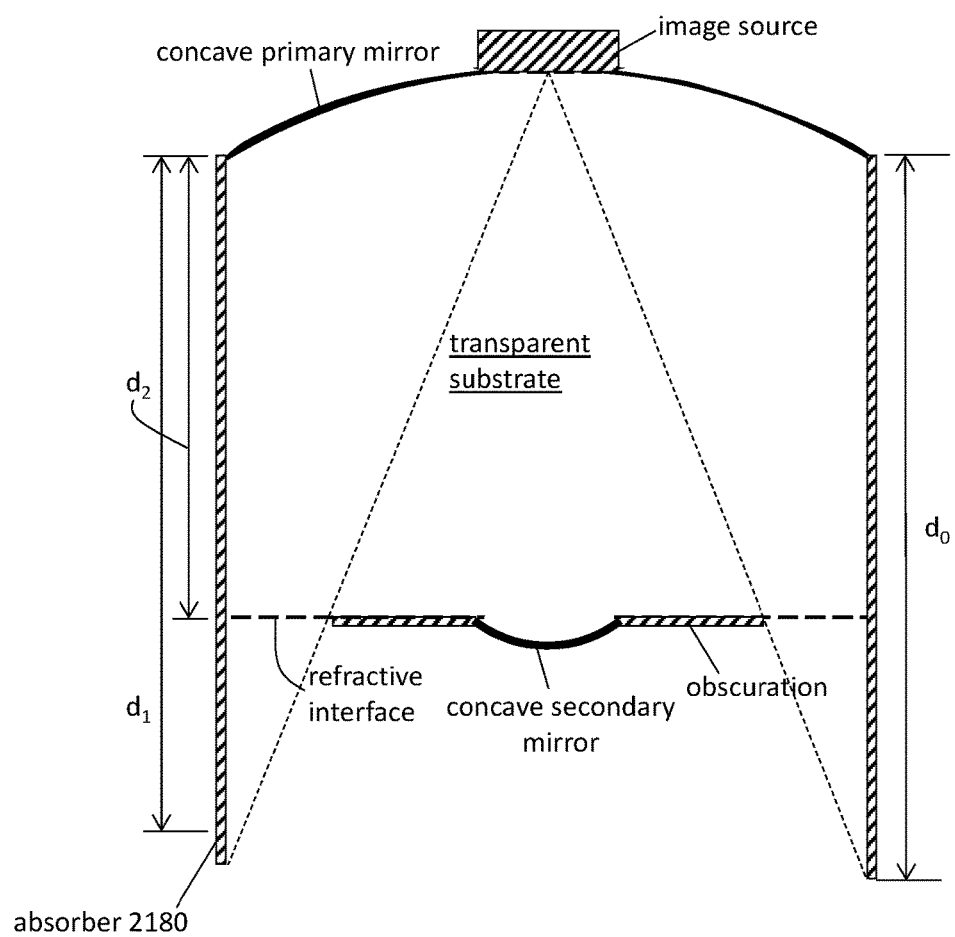
FIG. 21 shows a cross sectional view of a femtoprojector optical system with an extended side baffle.

FIG. 21 shows a femtoprojector optical system with an annular obscuration, an external absorbing tube 2180, and a concave secondary mirror. The external absorbing tube 2180 extends beyond the refractive interface. In the figure the tube 2180 has length do which is long enough to block stray rays from the image source that are not reflected by the primary mirror (i.e., stray rays that form the halo).

Design constraints on the overall size of the optical system may preclude the use of an external absorbing tube that is as long as needed to block every stray ray. It may only be possible to make a tube as long as $d_1$ or $d_2$, for example. A shortened, external tube is still useful in that it blocks some stray rays.

Figure 22:
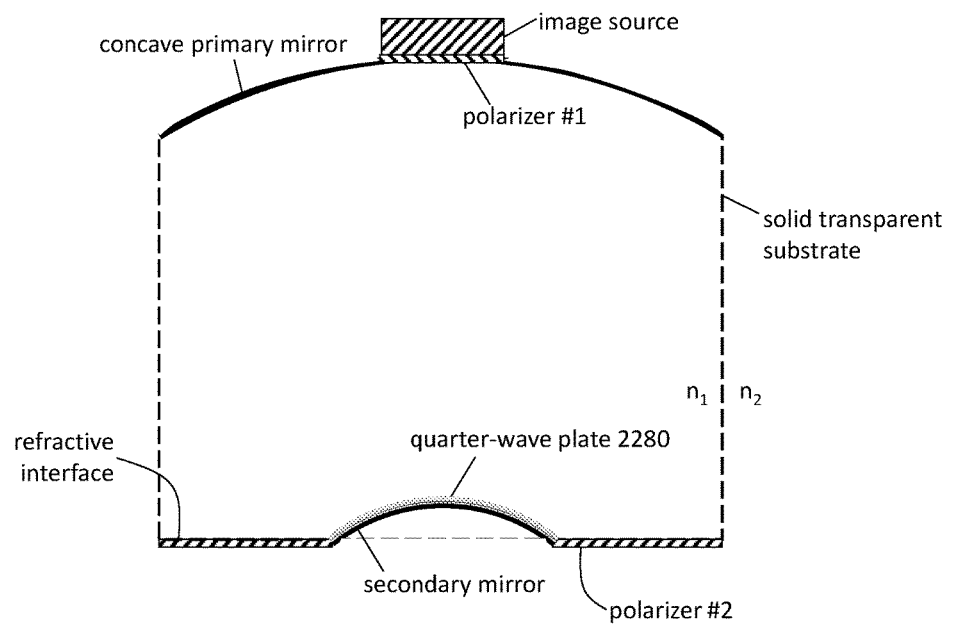
FIG. 22 shows a cross sectional view of a femtoprojector optical system including a polarization-based baffle system.

FIG. 22 shows a femtoprojector optical system including a polarization-based baffle system. In the system of FIG. 22, light rays emitted by the image source first pass through linear polarizer #1. Some of those rays then pass through an optical quarter wave plate 2280, are reflected by the secondary mirror and pass through the optical quarter wave plate again. After that, the rays are reflected by the primary mirror and then pass through linear polarizer #2.

Linear polarizer #2 is polarized perpendicular to linear polarizer #1. Light that passes through the quarter wave plate, is reflected, and passes through the quarter wave plate again has its polarization rotated by 90 degrees and therefore passes through linear polarizer #2. Light that is not reflected by the secondary mirror, and therefore does not pass through the quarter wave plate before and after, does not have its polarization rotated. That light is blocked by polarizer #2 since the light is polarized perpendicular to the polarization of the polarizer. Thus, the polarizer #2 blocks stray light.

In an alternate approach, the quarter-wave plate 2280 may be located on the concave primary mirror instead. So long as image-forming rays and stray rays are have different polarizations when they reach polarizer #2, the stray rays can be blocked by a polarization filter.

The polarizers and the optical quarter wave plate may be made from optical coatings. See, e.g. "Design and preparation of quarter-wave plate coatings", Gu Peifu, Tangjinfa (National Air Intelligence Center, 1995).

Design of any of the femtoprojector optical systems described herein is complicated by constraints such as the very small volume in which the system must fit, refractive indices of the substrate and the surrounding contact lens material, required optical magnification specifications, luminous flux required at the retina given a low-power image source, and image sharpness and contrast. When dealing with a large set of constraints it is helpful to have several adjustable design parameters. As described above, one example of an adjustable design parameter is mirror curvature. The primary mirror in all femtoprojector optical systems is concave, as shown in the figures. The secondary mirror, however, may have positive or negative curvature (i.e. it may be concave or convex) or it may be flat. The size of the secondary mirror is another adjustable parameter. An annular obscuration allows one to adjust the size of the mirror (at least from a light ray blocking perspective) independently of its curvature.

Figure 23:
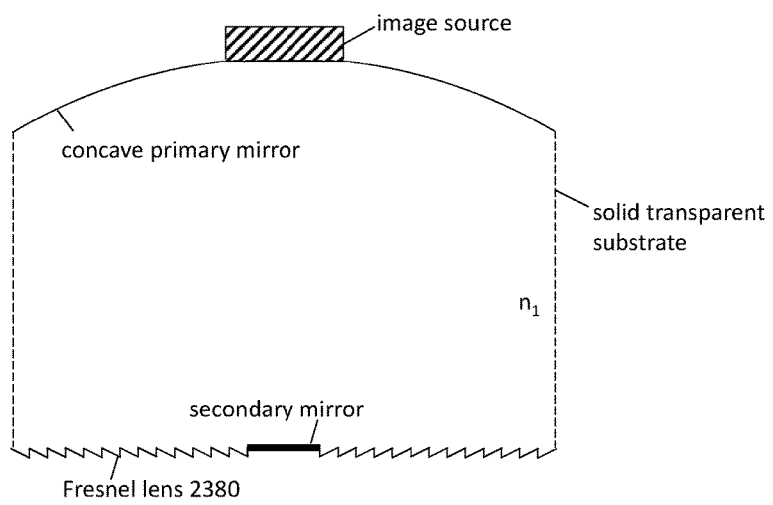
FIG. 23 shows a cross sectional view of a femtoprojector optical system with a Fresnel lens interface.
Figure 24:
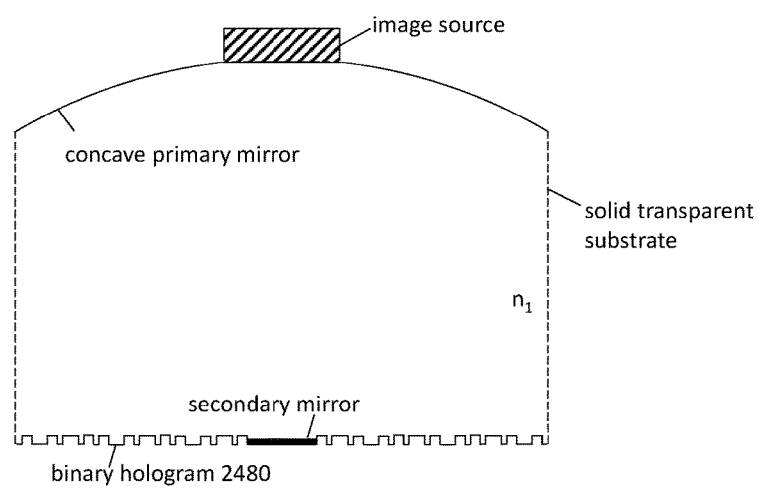
FIG. 24 shows a cross sectional view of a femtoprojector optical system with a binary hologram interface.

FIGS. 23-24 show different types of optical interfaces in femtoprojector optical systems. Any of these systems may have a concave, convex or flat secondary mirror and any of these systems may include an obscuration.

FIG. 23 shows a femtoprojector optical system with a flat secondary mirror and a Fresnel lens interface 2380. FIG. 24 shows a femtoprojector optical system with a flat secondary mirror and a diffractive interface 2480 (e.g., a binary hologram lens interface).

The surface profiles of the refractive interfaces in FIGS. 23 and 24 create lenses even though the interfaces are (macroscopically) flat overall. Fresnel lenses or binary holograms may be created on the interface by including their features in a mold in the case of injection molded parts or by turning on a lathe (Fresnel lens) or by photolithography and etching (Fresnel or hologram).

Figure 25:
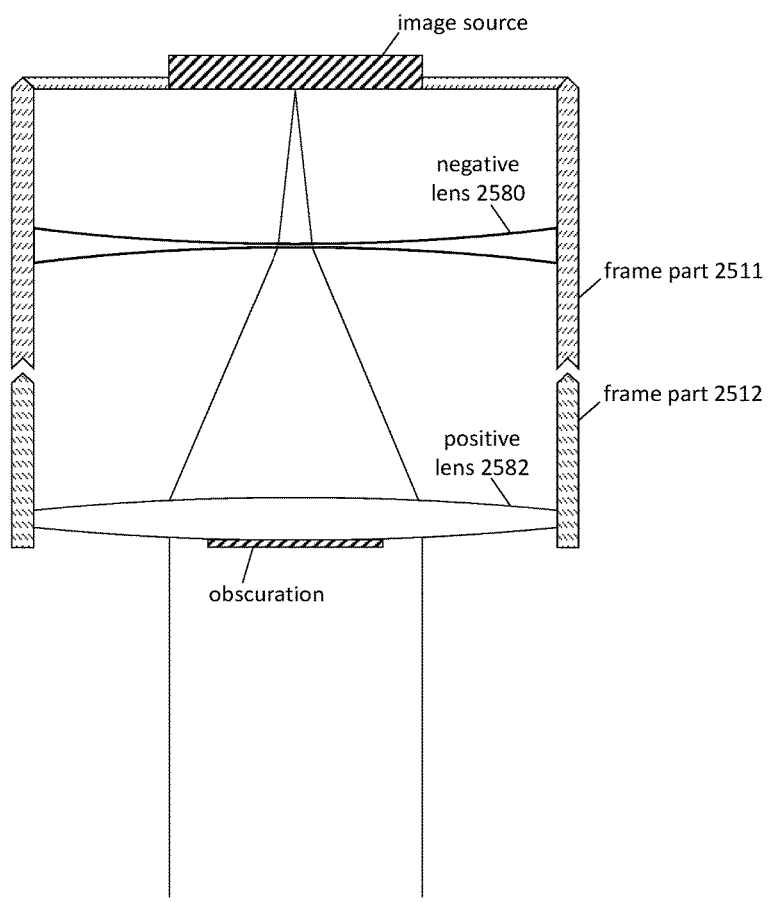
FIG. 25 shows a cross sectional view of an all-refractive femtoprojector optical system with an obscuration.

FIG. 25 shows an all-refractive femtoprojector optical system with an obscuration. The system of FIG. 25 may be assembled from two pieces: frame part 2511 and frame part 2512. The system of FIG. 25 includes an image source and two lenses 2580, 2582 that form a Galilean telescope. Light rays from the image source first pass through a negative lens 2580 before being projected by a positive lens 2582. The positive lens 2582 includes a circular obscuration in its center. The obscuration blocks light rays from passing through the center of the lens. It makes projected images sharper and have greater depth of focus than they otherwise would.

Figure 26:
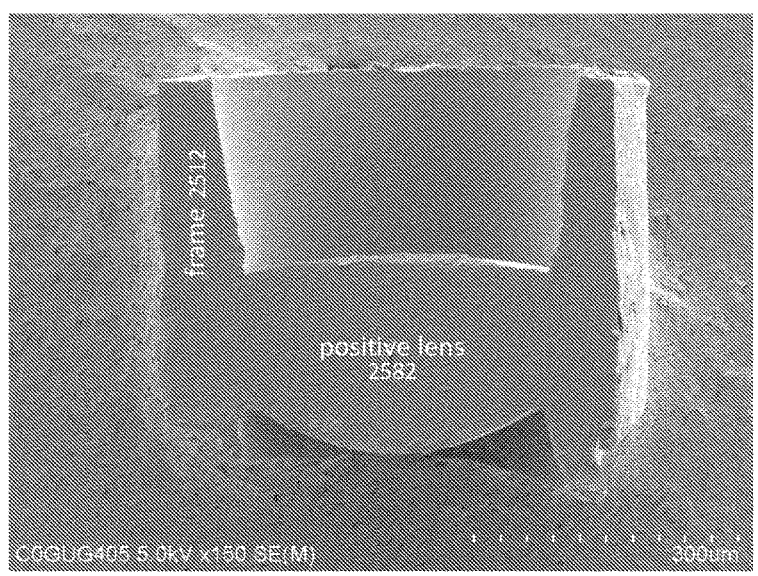
FIG. 26 is a scanning electron microscope photograph of part of the femtoprojector optical system of FIG. 25.

FIG. 26 is a scanning electron microscope photograph of frame part 2512 of the femtoprojector optical system of FIG. 25. In the photograph, the positive lens 2582 is about 0.3 mm in diameter and 0.2 mm thick. The lens 2582 is made of plastic and is manufactured by injection molding. The frame 2512 is designed to fit with another frame part that includes a negative lens to form the structure of FIG. 25. The part has been cross sectioned by a polishing process so that the aspherical shape of the lens surfaces is apparent.

Figure 27:
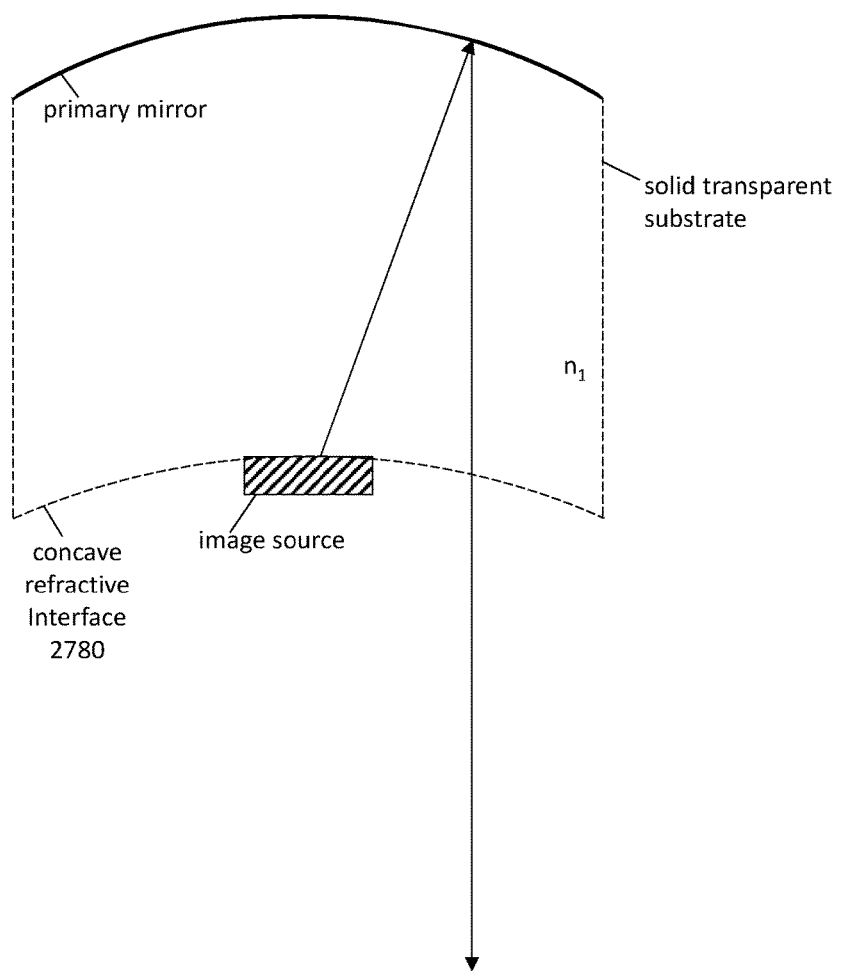
FIG. 27 shows a cross sectional view of a femtoprojector optical system with no secondary mirror.

FIG. 27 shows a femtoprojector optical system with no secondary mirror. FIG. 27 provides a cross sectional view. In the system of FIG. 27, an image source emits rays that propagate directly to a primary mirror before being reflected and leaving the system through a refractive interface 2780. The image source takes the place of the secondary mirror compared to the designs shown previously. In the example of FIG. 27, the refractive interface 2780 is concave, but it could be convex or flat in other designs.

A variety of femtoprojector optical systems have been described. Each of them can be made small enough to fit in a contact lens using plastic injection molding, diamond turning, photolithography and etching, or other techniques. Most, but not all, of the systems include a solid cylindrical transparent substrate with a curved primary mirror formed on one end and a secondary mirror formed on the other end. Any of the designs may use light blocking, light-redirecting, absorbing coatings or other types of baffle structures as needed to reduce stray light.

When a femtoprojector optical system is described as "cylindrical", its cylindrical shape may include a flat on a sidewall. In other words, the circular cross section of a perfect cylinder is not a requirement, just an overall cylindrical shape. The structure shown in FIG. 4 is cylindrical. Optical systems may also be made from extrusions of other shapes, such as triangles, squares, pentagons, etc.

Although the detailed description contains many specifics, these should not be construed as limiting the scope of the invention but merely as illustrating different examples. It should be appreciated that the scope of the disclosure includes other embodiments not discussed in detail above. For example, materials of various indices described above could in certain designs be air or gas filled. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A femtoprojector optical system for projecting an image produced by an image source to a retina of a user's eye, the femtoprojector optical system comprising:
   a convex secondary mirror facing the image source, where image-forming rays from the image source are incident on and reflected by the secondary mirror;
   a concave primary mirror facing the secondary mirror and further reflecting the image-forming rays from the secondary mirror, the secondary mirror and primary mirror cooperating to project the image from the image source;
   a light baffle system that includes an obscuration, the obscuration blocking stray rays from the image source that are not reflected by the secondary mirror; and
   a solid transparent substrate with the primary mirror on one end of the substrate and with the secondary mirror on an opposite end of the substrate;
   where the femtoprojector optical system is small enough to mount in a contact lens wearable by a human user.

2. The femtoprojector optical system of claim 1 where the light baffle system prevents any stray rays from being projected to an area that overlaps with the projected image.

3. The femtoprojector optical system of claim 1 where the obscuration blocks all axially-propagating rays from the image source that are not reflected by the secondary mirror.

4. The femtoprojector optical system of claim 1 where the obscuration is annular in shape, and an inner edge of the annular obscuration is adjacent to an outer edge of the secondary mirror.

5. The femtoprojector optical system of claim 1 where the obscuration is annular in shape, and a maximum lateral dimension a of the annular obscuration complies with $$a \geq b + FOV(h/n_{fp}),$$

where $n_{fp}$ is the index of refraction of material into which the image source emits light, h is a height of the femtoprojector optical system, b is a maximum lateral dimension of the image source, and FOV is a field of view occupied by the image produced by the image source.

6. The femtoprojector optical system of claim 1 where the obscuration is axially offset from the secondary mirror.

7. The femtoprojector optical system of claim 1 where the obscuration is sloped towards the image source.

8. The femtoprojector optical system of claim 1 where the light baffle system further includes a sidewall that is external to the primary mirror and blocks stray rays emitted from the image source at oblique angles.

9. The femtoprojector optical system of claim 8 where the sidewall is an absorbing coating that is an integral part of the femtoprojector optical system.

10. The femtoprojector optical system of claim 8 where the substrate is inserted into a hole with an absorbing sidewall.

11. The femtoprojector optical system of claim 1 where a maximum lateral dimension of the secondary mirror is smaller than a maximum lateral dimension of the image source.

12. The femtoprojector optical system of claim 11 where a maximum lateral dimension of the obscuration is larger than the maximum lateral dimension of the image source.

13. The femtoprojector optical system of claim 1 where the femtoprojector optical system has an exit aperture with a maximum lateral dimension of not more than 1 mm.

14. The femtoprojector optical system of claim 1 where the primary mirror is a reflective material coating the end of the substrate.

15. The femtoprojector optical system of claim 14 where the end of the substrate coated by the primary mirror is formed by one of injection-molding, compression molding, diamond-turning, etching, embossing, or curing a photosensitive polymer.

16. The femtoprojector optical system of claim 1 where the substrate includes a clear, non-reflective mounting area for the image source.

17. The femtoprojector optical system of claim 1 where the primary mirror and the secondary mirror are both aspheric.

18. The femtoprojector optical system of claim 1 where the femtoprojector optical system has a height h as measured from the image source to the secondary mirror of less than 2 mm and an aspect ratio of (height h):(width w) of not more than 2:1 where the width w is a width of the primary mirror.

19. The femtoprojector optical system of claim 18 where the aspect ratio of (height h):(width w) is not more than 1:1.

20. The femtoprojector optical system of claim 18 where the height h is 1 mm or less.

21. The femtoprojector optical system of claim 1 where a ratio of the contact lens diameter to the width w is in a range of 15:1 to 30:1.

22. The femtoprojector optical system of claim 1 where the image source is Lambertian.

23. The femtoprojector optical system of claim 1 where the femtoprojector optical system provides a magnification in a range of 3×-5×.

* * * * *